United States Patent
Awano et al.

(10) Patent No.: US 6,477,118 B1
(45) Date of Patent: Nov. 5, 2002

(54) METHOD AND APPARATUS FOR RECORDING AND REPRODUCING INFORMATION BY APPLYING FIELD IN A DIRECTION OTHER THAN THE DIRECTION OF MAGNETIZATION OR THE DIRECTION TO A SURFACE OF AN INFORMATION RECORDING MEDIUM

(75) Inventors: Hiroyuki Awano, Noda; Masaki Sekine, Kitasouma-gun; Manabu Tani, Kitasouma-gun; Masafumi Yoshihiro, Kitasouma-gun; Hiroshi Ido, Kitasouma-gun, all of (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 09/449,765

(22) Filed: Nov. 26, 1999

(30) Foreign Application Priority Data

Nov. 27, 1998 (JP) ............................................ 10-352199
Dec. 4, 1998 (JP) ............................................ 10-360003

(51) Int. Cl.$^7$ ................................................ G11B 11/00
(52) U.S. Cl. ................................ 369/13.14; 369/13.13; 369/13.15
(58) Field of Search ........................ 369/13.13, 13.14, 369/13.17, 13.32, 13.33, 13.2, 13.11, 13.16, 13.15; 360/59; 428/694 ML

(56) References Cited

U.S. PATENT DOCUMENTS 5,783,320 A * 7/1998 Shimazaki et al. ............ 369/13
6,122,228 A * 9/2000 Shimazaki et al. ............ 369/13

FOREIGN PATENT DOCUMENTS

JP          A-7-85526          3/1995
WO          WO 98/02878        1/1998

OTHER PUBLICATIONS

Y. Murakami et al., *Super Resolution Readout Of A Magneto–Optical Disk With An In–Plane Magnetization Layer*, Proceedings of Magneto–Optical Recording International Symposium ''92, J. Magn. Soc. Japan, vol. 17, Supplement No. S1 (1993), pp. 201–204.

* cited by examiner

*Primary Examiner*—Tan Dinh
(74) *Attorney, Agent, or Firm*—Oliff & Berridge, PLC

(57) ABSTRACT

Disclosed are a reproducing method and a reproducing apparatus capable of performing reproduction with a wide power margin, as well as a recording method and a recording apparatus preferably used for super high density recording. A recording and reproducing apparatus 101 principally comprises a magnetic field-applying unit, a laser beam-radiating section, and a signal processing system. A magnetic coil 29, which is provided for the magnetic field-applying unit, is arranged so that its axis of magnetic field generation 102 is oblique to a surface of an information-recording medium 100. A reproducing magnetic field is applied in an oblique direction to the surface of the information-recording medium 100 by using the magnetic coil 29 while radiating a reproducing light beam to the medium by using the laser beam-radiating section. Accordingly, the leak magnetic field in the in-plane direction from a recording magnetic domain in a recording layer is amplified. The inversion of magnetization in a reproducing layer tends to occur, and the reproducing power margin is widened. The recording and reproducing apparatus 101 is also capable of recording information. An extremely minute recording magnetic domain can be formed in the recording layer of the information-recording medium.

7 Claims, 13 Drawing Sheets

1: SUBSTRATE
2: DIELECTRIC LAYER
3: REPRODUCING LAYER
4: NON-MAGNETIC LAYER
5: RECORDING AUXILIARY LAYER
6: RECORDING LAYER
7: PROTECTIVE LAYER

1: SUBSTRATE
2: DIELECTRIC LAYER
4: NON-MAGNETIC LAYER
6: RECORDING LAYER
7: PROTECTIVE LAYER
13: MAGNETIC DOMAIN-MAGNIFYING REPRODUCING LAYER
15: REPRODUCING AUXILIARY LAYER

METHOD AND APPARATUS FOR RECORDING AND REPRODUCING INFORMATION BY APPLYING FIELD IN A DIRECTION OTHER THAN THE DIRECTION OF MAGNETIZATION OR THE DIRECTION TO A SURFACE OF AN INFORMATION RECORDING MEDIUM

BACKGROUND OF THE INVENTION

1. Field of the Invention

The present invention relates to an information-recording medium on which information is reproduced by transferring magnetization information recorded in a recording layer to a reproducing layer. The present invention also relates to a recording and reproducing method to be performed on the information-recording medium, and a recording and reproducing apparatus to be used for the information-recording medium. In particular, the present invention relates to an information-recording medium in which minute recording magnetic domains are easily formed. The present invention also relates to a method for recording information and a method for reproducing information by applying a recording magnetic field and a reproducing magnetic field by means of a novel magnetic field-applying method respectively. Further, the present invention relates to a recording apparatus and a reproducing apparatus to be preferably used for the above as well.

2. Description of the Related Art

The optical recording medium such as a magneto-optical recording medium is known as an external memory for the computer or the like. The magneto-optical recording medium can deal with a large capacity of data such as animation image and voice data, and hence it is frequently used as a recording medium suitable for the multimedia age. In general, the recording on the magneto-optical recording medium is performed by utilizing the temperature characteristic of the coercive force of a magnetic material which constitutes a recording layer. That is, a recording magnetic field, which has a direction opposite to a direction in the initial state, is applied to the magneto-optical recording medium in which the direction of magnetization in the recording layer is aligned in the certain direction in the initial state. Simultaneously, a recording light beam is radiated to locally heat the recording layer. Accordingly, the coercive force is lowered in a heated area of the recording layer to cause inversion into the direction of the recording magnetic field. After that, the magnetization of the recording layer is settled in a stable state while maintaining the inversion in the cooling process to form the recording magnetic domain. Thus, the information is recorded as magnetization information in the recording layer.

In recent years, it is demanded to further increase the storage capacity of the magneto-optical recording medium. Those suggested to realize such a demand include, for example, the mark edge recording system and the light pulse magnetic field modulation system. In the mark edge recording system, only one piece of information is not given to one recording mark in the recording layer, but pieces of information are given to a leading edge and a trailing edge of one recording mark, respectively. That is, the recording density in the linear direction is improved by giving two pieces of information to one recording mark. According to this method, it is possible to achieve a high density of about 1.5-fold, even in consideration of the separation limit of the reproducing light beam during reproduction.

On the other hand, the light pulse magnetic field modulation system resides in a method in which a recording magnetic field having a polarity corresponding to a recording signal is applied while radiating a pulsed recording light beam in synchronization with a recording clock. According to this method, it is possible to form a minute recording magnetic domain in a recording layer, and the recording density is improved.

When it is intended to further advance the realization of the high density of the magneto-optical recording medium, it is considered to be extremely important to control the recording magnetic field and the recording light beam, for example, in the case of the light pulse magnetic field modulation system. That is, in order to form a minute recording magnetic domain in the recording layer, it is necessary to strictly control the power of the recording light beam which determines the size of the recording magnetic domain, and the power of the recording magnetic field which is used to invert such a recording magnetic domain respectively. Therefore, the power margin (write power margin) is narrowed for the recording light beam and the recording magnetic field. For this reason, it has been strongly demanded to realize a novel recording method in which the high density recording can be performed with ease.

On the other hand, a problem also arises when it is intended to reproduce the minute recording magnetic domain formed in the recording layer. In general, the spot diameter of the reproducing light beam is restricted by the limit of NA of a lens carried on an optical head, and it cannot be decreased to be smaller than the above. For this reason, it is impossible to individually reproduce a plurality of minute magnetic domains existing within the spot of the reproducing light beam. That is, the individual minute magnetic domains cannot be reproduced, because of the shortage of resolution of the reproducing light beam. Therefore, it has been required to reproduce the minute magnetic domain by using the reproducing spot diameter having a certain size in the present circumstances.

The magnetically induced super resolution technique (MSR) has been suggested as a method for dissolving the foregoing problem, as described, for example, in *Journal of Magnetic Society of Japan*, Vol. 17 Supplement No. S1, pp. 201 (1993). In this technique, even when two recording magnetic domains are present within the reproducing light beam spot, one of the magnetic domains is masked to disappear so that the effective field of vision is narrowed. Thus, the other recording magnetic domain can be reproduced. The use of this technique makes it possible to improve the reproducing resolution without actually reducing the diameter of the reproducing light beam spot. However, even when the magnetically induced super resolution technique is used, the reproduced signal intensity obtained from each magnetic domain is not changed. Therefore, C/N of the reproduced signal is still low.

The present inventors have disclosed, in a patent document of International Publication No. WO98/02878, a magneto-optical recording medium comprising a magnetically magnifying reproducing layer and a recording layer on a substrate, in which a minute magnetic domain in the recording layer is individually transferred to the reproducing layer during reproduction, a reproducing magnetic field is applied, and thus the magnetic domain transferred to the reproducing layer can be magnified and reproduced. When the magneto-optical recording medium is used, the reproduced signal intensity is remarkably increased, because the magnetic domain transferred to the magnetically magnifying reproducing layer is magnified to have a size which is approximate to the light spot size. This technique is called "MAMMOS" (Magnetic Amplifying Magneto-Optical System), which dissolves the foregoing problem of the magnetically induced super resolution technique concerning the reproducing C/N of the minute magnetic domain.

In MSR and MAMMOS as described above, the reproducing magnetic field is applied perpendicularly to the medium, and the recording magnetic domain, which is located in the high temperature area of the recording layer heated by being irradiated with the reproducing light beam, is transferred to the reproducing layer to read the information. However, when the reproduction is performed on an information-recording medium which is subjected to the super high density recording, it is feared that any reproduced signal is detected as a result of inversion of a magnetic domain in the reproducing layer in the recording direction effected by a large reproducing magnetic field, although no recording magnetic domain exists in the high temperature area of the recording layer heated by being irradiated with the reproducing light beam. On the other hand, in order to ensure that a magnetic domain in the reproducing layer in the recording direction is inverted by a certain level of reproducing magnetic field when a recording magnetic domain exists in the high temperature area of the recording layer heated by being irradiated with the reproducing light beam. Accordingly, it is necessary to strictly control the powers of the reproducing light beam and the reproducing magnetic field within a limited ranges. Therefore, a problem arises in that the power margin (read power margin) is narrowed for the reproducing light beam and the reproducing magnetic field.

SUMMARY OF THE INVENTION

The present invention has been made in order to solve the problems involved in the conventional technique as described above. A first object of the present invention is to provide a recording method which makes it possible to record information with a wide recording light beam power margin and a wide recording magnetic field power margin.

A second object of the present invention is to provide a novel recording method which makes it possible to record information in a recording layer at a super high density.

A third object of the present invention is to provide a recording apparatus which makes it possible to form a minute recording magnetic domain in a recording layer of an information-recording medium easily and highly accurately.

A fourth object of the present invention is to provide an information-recording medium which makes it possible to reproduce information with a wide reproducing light beam power margin and a wide reproducing magnetic field power margin.

A fifth object of the present invention is to provide a reproducing method which makes it possible to reproduce a recording magnetic domain recorded at a high density in a recording layer reliably with an amplified reproduced signal intensity.

A sixth object of the present invention is to provide a reproducing apparatus which makes it possible to individually and reliably reproduce a minute magnetic domain formed on a medium even when the medium is an information-recording medium subjected to high density recording.

According to a firs aspect of the present invention, there is provided a recording method on an information-recording medium having a plurality of tracks for recording information by applying a recording magnetic field by using a magnetic field-generating source to an area on a surface of the information-recording medium irradiated with a recording light beam while radiating the recording light beam onto the surface of the disk-shaped information-recording medium including a recording layer, the method comprising:

generating the recording magnetic field from the magnetic field-generating source in an oblique direction with respect to the surface of the information-recording medium so that the recording magnetic field has an in-plane component which is parallel to the surface of the information-recording medium in the irradiated area, and the in-plane component is in the same direction as a direction of a track existing in the irradiated area.

In the recording method of the present invention, the information is recorded by radiating the recording light beam onto the surface of the information-recording medium, and generating the recording magnetic field from the magnetic field-generating source in the oblique direction with respect to the surface of the information-recording medium. In this process, the recording magnetic field is generated from the magnetic field-generating source so that the recording magnetic field has the in-plane component which is parallel to the surface of the medium in the area irradiated with the recording light beam, and the in-plane component is directed in the same direction as the direction of the track existing in the irradiated area. According to the recording method as described above, it is possible to invert the magnetization of the magnetic domain in the recording layer more easier as compared with the conventional technique in which the magnetic field is applied in the perpendicular direction. Therefore, it is possible to widen the power margin for the recording light beam and the recording magnetic field. The reason of this effect will be explained below.

According to the study performed by the present inventors, it has been revealed that the recording magnetic domain can be easily formed when the component in the in-plane direction of the recording medium (hereinafter referred to as "in-plane component of the recording magnetic field") is included as a vector component of the recording magnetic field to be applied to the information-recording medium, because of the following reason. That is, the inversion of magnetization in the recording layer is triggered by the in-plane component of the recording magnetic field. In other words, when the minute magnetic domain, which exists in the recording light beam spot in the recording layer, is heated by being irradiated with the recording light beam, the minute magnetic domain is gradually directed to the in-plane component by the aid of the in-plane component of the recording magnetic field. When the component in the perpendicular direction of the recording magnetic field is applied in the recording direction (explanation will be made below assuming that the upward direction is the recording direction) to the minute magnetic domain directed in the in-plane direction, the minute magnetic domain is inclined upwardly from the in-plane direction. This minute magnetic domain serves as a trigger, and the magnetization in a predetermined temperature area (area in which the coercive force is lowered) within the recording light beam spot in the recording layer is inverted in a chained manner to form the recording magnetic domain. The minute magnetic domain is referred to as "seed magnetic domain". During the recording, the inversion of magnetization gradually occurs starting from the seed magnetic domain which is strongly affected by the in-plane magnetic field. The generation of the seed magnetic domain is called "nucleation".

The position, at which the seed magnetic domain is generated in the recording layer, i.e., the position, at which the inversion of magnetization firstly occurs, is called "nucleation point". In the present invention, the recording magnetic field is applied obliquely to the surface of the information-recording medium so that the magnetic field component in the in-plane direction is included. Therefore, the inversion of magnetization of the recording magnetic domain is easily caused. Further, the direction of magnetic field generation of the recording magnetic field is adjusted so that the in-plane direction of the recording magnetic field is parallel to the tangential direction of the information-recording medium when the recording magnetic field is applied to the disk-shaped medium. Therefore, it is possible to concentrate the nucleation on one place. Accordingly, the formation of the recording mark (recording magnetic domain) can be advanced from one nucleation easily and reliably. In order that the in-plane direction of the recording magnetic field is parallel to the tangential direction of the information-recording medium, for example, the magnetic coil, which is used to generate the recording magnetic field, may be arranged so that the direction of the geometrically projected component of the axis of magnetic field generation on the medium surface is parallel to the tangential direction of the medium. According to the recording medium as described above, the power margins of the recording light beam and the recording magnetic field are widened as compared with the conventional technique.

On the other hand, if the recording magnetic field is applied only in the perpendicular direction with respect to the medium as performed in the conventional technique, it is difficult to locally cause the nucleation. In this case, it is considered that the invention of magnetization is caused all at once in a unit of the size of the recording magnetic field when the magnitude of the recording magnetic field exceeds a predetermined threshold value. On the contrary, in the present invention, the in-plane component of the recording magnetic field serves to locally generate the minute seed magnetic domain the recording layer. The magnetic domain is inverted in a chained manner taking advantage of this opportunity, and thus the recording magnetic domain is formed. Accordingly, the recording magnetic domain can be formed controllably, and it is possible to easily form the minute magnetic domain. Therefore, according to the recording method of the present invention, it is possible to form the super minute magnetic domain in the controlled fashion. Thus, it is possible to expect the super high density recording.

Japanese Patent Application Laid-Open No. 7-85526 discloses a magneto-optical recording apparatus comprising a magnetic field-generating unit for applying an external magnetic field in an inclined direction with respect to a film surface of a magnetic film of a magneto-optical recording medium. However, this patent document neither describes nor suggests the fact that the magnetic field is obliquely applied so that the direction of magnetic field generation is parallel to the tangential direction of the disk-shaped medium (a direction of a track in an area o which a recording light is irradiated) to concentrate the nucleation on one piece.

In the recording method of the present invention, when the recording layer of the information-recording medium is a perpendicularly magnetizable film, it is preferable that the information-recording medium comprises a recording auxiliary layer having perpendicular magnetic anisotropy which is smaller than perpendicular magnetic anisotropy of the recording layer. It is preferable that the recording auxiliary layer is formed in contact with one surface of the recording layer. The layers may be stacked in an order of the recording layer and the recording auxiliary layer disposed adjacently to the substrate, or in an order of the recording auxiliary layer and the recording layer disposed adjacently to the substrate. When the recording auxiliary layer has perpendicular magnetization upon the recording, i.e., when the recording auxiliary layer has perpendicular magnetization within a recording temperature range (200° C. to 350° C.), then the magnetization of the recording auxiliary layer is aligned to the recording magnetic field during the recording to cause the inversion of magnetization in accordance with the nucleation prior to the magnetic domain in the recording layer. As a result, the inversion of magnetization of the recording magnetic domain in the recording layer tends to occur by the aid of the trigger of the inversion of magnetization in the recording auxiliary layer.

On the other hand, when the recording auxiliary layer has in-plane magnetization upon the recording, i.e., when the recording auxiliary layer has in-plane magnetization within the recording temperature range, then the in-plane magnetization, which is directed in an arbitrary direction in the recording auxiliary layer, is aligned in the direction of the in-plane component of the recording magnetic field during the recording. Therefore, the inversion of magnetization tends to occur in the recording layer by the aid of the trigger of the in-plane magnetization aligned in the certain direction in the recording auxiliary layer.

In the present invention, those usable as a material for constructing the recording auxiliary layer include, for example, GdFeCo, GdFe, GdCo, GdDyFe, GdDyCo, Gd-based alloy added with transition metal, transition metal-noble metal alloy, and multilayered film composed of the above. It is also possible to use, for example, alloy composed of CoCr alloy and containing high melting point metal such as Ta, Pt, and Mo, and granular alloy composed of Co-Pd alloy or Co-Pt alloy and non-magnetic substance.

In the present invention, it is preferable to use a perpendicularly magnetizable film which exhibits perpendicular magnetic anisotropy at a temperature of not less than the room temperature, as a material for constructing the recording layer of the information-recording medium. For example, it is most preferable to use amorphous alloy composed of transition metal and rare earth such as TbFeCo, DyFeCo, and TbDyFeCo. Further, for example, it is also possible to stack, on the recording layer, an alternate stacked member of Pt film and Co film and garnet-based oxide magnetic member. Those preferably usable also include CoCr-based alloy film composed of perpendicular magnetic recording material used for hard disk, added with, for example, CoPt-based alloy film having in-plane magnetization component, and Pt/Co perpendicularly magnetizable film added with CoCr-based alloy film having in-plane magnetization component.

In the recording method of the present invention, in order to apply the recording magnetic field in the oblique direction with respect to the surface of the information-recording medium, for example, a magnetic coil for generating the recording magnetic field as having been hitherto used may be actively inclined to apply the recording magnetic field so that the direction of the magnetic field generated from the magnetic coil (axis of magnetic field generation) is oblique with respect to the surface of the information-recording medium.

According to a second aspect of the present invention, there is provided a recording method on an information-recording medium for recording information on the information-recording medium including a recording layer by radiating a recording light beam while applying a recording magnetic field, wherein the information-recording medium includes a recording auxiliary layer in contact with the recording layer, the recording auxiliary layer having perpendicular magnetic anisotropy smaller than perpendicular magnetic anisotropy of the recording layer, the method comprising:

applying the recording magnetic field in an oblique direction to a surface of the information-recording medium.

According to the recording method of the present invention, the recording magnetic field is applied in the oblique direction to the information-recording medium including the recording auxiliary layer in contact with the recording layer. The recording auxiliary layer is constructed by using a magnetic material having the perpendicular magnetic anisotropy which is smaller than that of the recording layer. Accordingly, when the recording magnetic field is applied in the oblique direction, the magnetization in the recording auxiliary layer is inverted prior to the magnetization in the recording layer. Taking advantage of the opportunity of the inversion of magnetization in the recording auxiliary layer, the magnetization in the recording layer is easily inverted by the aid of the exchange coupling force. Thus, the information can be recorded with ease as compared with the conventional technique.

According to a third aspect of the present invention, there is provided a recording method on an information-recording medium for recording information on the information-recording medium including a recording layer by radiating a recording light beam while applying a recording magnetic field, the method comprising:

applying the recording magnetic field to a surface of the information-recording medium not only in a perpendicular direction but also in an in-plane direction.

According to the recording method as described above, the intensity and the application timing of the recording magnetic field in the in-plane direction may be made different from those of the recording magnetic field in the perpendicular direction. Further, the application direction of the in-plane recording magnetic field may be made different as well between the process in which information is recorded and the process in which information is erased.

According to a fourth aspect of the present invention, there is provided a recording apparatus for an information-recording medium including a perpendicular magnetic recording layer, comprising:

a recording magnetic field-generating unit having an axis of magnetic field generation, for generating a recording magnetic field along the axis to the disk-shaped information-recording medium; and a light source for radiating a recording light beam onto the information-recording medium, wherein:

the recording magnetic field-generating unit is arranged so that the axis of magnetic field generation is directed in the oblique direction with respect to the direction of magnetization of the recording layer of the information-recording medium, and a geometrically projected component of the axis of magnetic field generation on a medium surface is directed in a direction of a track existing in an area irradiated with the recording light beam.

The recording magnetic field-generating unit may be also arranged such that the axis of magnetic field generation is parallel to the optical axis of the recording light beam, and it is deviated from the optical axis of the recording light beam in the in-plane direction of the information-recording medium. Alternatively, the recording magnetic field-generating unit may be arranged such that the axis of magnetic field generation of the recording magnetic field-generating unit obliquely intersects the optical axis of the recording light beam in the information-recording medium.

According to a fifth aspect of the present invention, there is provided a recording apparatus for an information-recording medium, comprising:

a recording magnetic field-generating unit for applying a recording magnetic field to the information-recording medium including a perpendicular magnetic recording layer; and a light source for radiating a recording light beam onto the information-recording medium, the recording magnetic field-generating unit including:

a first magnetic field-generating unit for generating a magnetic field in a perpendicular direction with respect to a surface of the information-recording medium; and a second magnetic field-generating unit for generating a magnetic field in an in-plane direction with respect to the surface of the information-recording medium.

The recording apparatus of the present invention includes the second magnetic field-generating unit with which the magnetic field can be generated in the in-plane direction. Therefore, it is easy to cause the inversion of magnetization of the recording magnetic domain of the information-recording medium. The intensity and the application timing of the magnetic field generated by the second magnetic field-generating unit, and the alternating cycle when an alternating magnetic field is generated are not necessarily the same as those of the first magnetic field-generating unit, and it is possible to make adjustment so that they are different from each other. When the information-recording medium has a dark-shaped configuration, it is preferable that the direction of the axis of magnetic field generation of the second magnetic field-generating unit is set to be parallel to the direction of a track existing in an area irradiated with the recording light beam.

The recording apparatus of the present invention may comprise a lens for collecting and radiating the recording light beam onto the information-recording medium. The lens may be a high NA lens having an NA (numerical aperture) of not less than 0.5, preferably not less than 0.6. More preferably, the recording apparatus of the present invention comprises a solid immersion lens. The use of the solid immersion lens effectively increases the numerical aperture of the lens. Therefore, it is possible to decrease the light spot diameter. Accordingly, information can be recorded at a super high density. When the high NA lens and/or the solid immersion lens is used, it is preferable that at least one of the first and second magnetic field-generating units is installed under or around the high NA lens or the solid immersion lens.

According to a sixth aspect of the present invention, there is provided an information-recording medium comprising a recording layer and a reproducing layer, the medium further comprising:

a reproducing auxiliary layer having perpendicular magnetic anisotropy smaller than perpendicular magnetic anisotropy of the recording layer, the reproducing auxiliary layer being disposed between the recording layer and the reproducing layer.

In the present invention, the reproducing auxiliary layer, which has the perpendicular magnetic anisotropy smaller than that of the recording layer, is formed between the recording layer and the reproducing layer. Accordingly, the recording magnetic domain in the recording layer can be easily transferred to the reproducing layer. Therefore, it is possible to widen the power margins of the reproducing light beam and the reproducing magnetic field. The reason of this effect will be explained below.

According to the study performed by the present inventors, the following fact has been revealed concerning the information-recording medium in which information is reproduced by transferring the recording magnetic domain in the recording layer to the reproducing layer. That is, the inversion of magnetization in the reproducing layer is caused by the trigger of the in-plane component of the leak magnetic field from the recording magnetic domain. As shown in FIG. 8A, the leak magnetic field from a recording magnetic domain 201 in a recording layer 600 includes a perpendicular component 210 which outgoes in the perpendicular direction, as well as in-plane components, i.e., in-plane components 211, 212 directed toward non-recording magnetic domains 202, 203 (magnetization in the downward direction in the drawing) located adjacent to the recording magnetic domain respectively. It is considered that minute magnetic domains 221, 222 of a reproducing layer 300, which are located substantially just over boundaries between the recording magnetic domain 201 and the non-recording magnetic domains 202, 203, are gradually directed toward the in-plane direction by the aid of the in-plane components 211, 212 of the leak magnetic field, when they are heated by being irradiated with the reproducing light beam respectively. When a reproducing magnetic field Hr is applied to the upward direction to the minute magnetic domains 221, 221 having been directed in the in-plane direction, the minute magnetic domains 221, 222 are inclined to the upward direction from the in-plane direction respectively (FIG. 8B). The magnetic domains 221, 222 serve as the trigger (taking advantage of the opportunity) so that all of magnetic domains 213 in a predetermined area in the reproducing light beam spot in the reproducing layer make inversion in a chained manner (FIG. 8C). The minute magnetic domains 221, 222 are seed magnetic domains. During the reproduction, the inversion of magnetization is gradually caused from the seed magnetic domains 221, 222 disposed substantially just over the boundaries between the recording magnetic domain 201 and the non-recording magnetic domains 202, 203. Therefore, it is considered that if the magnetic field in the in-plane direction can be increased at the positions of occurrence of the inversion of magnetization, i.e., at the nucleation points substantially just over the boundaries between the recording magnetic domain 201 and the non-recording magnetic domains 202, 203, then it is easy to cause the inversion of magnetization in the reproducing layer. In the present invention, the reproducing auxiliary layer, which exists between the recording layer and the reproducing layer, is composed of a material having perpendicular magnetic anisotropy smaller than that of the recording layer. Therefore, the magnetization of the reproducing auxiliary layer tends to be aligned in the direction of the leak magnetic field of the recording magnetic domain. Thus, the leak magnetic field in the in-plane direction from the recording magnetic domain is remarkably emphasized. Especially, when the saturation magnetization of the reproducing auxiliary layer is made larger than the saturation magnetization of the recording layer, it is possible to further emphasize the leak magnetic field in the in-plane direction. Therefore, the inversion of magnetization of the seed magnetic domain in the reproducing layer is easily caused by the amplified in-plane component from the reproducing auxiliary layer.

Accordingly, the power margins of the reproducing light beam and the reproducing magnetic field are widened as compared with the conventional technique.

In order to reproduce recorded information on the information-recording medium of the present invention, it is desirable that the reproducing light beam is radiated, and the reproducing magnetic field is applied obliquely with respect to the medium. When the reproducing magnetic field is applied obliquely to the information-recording medium as shown in FIG. 9, then the magnetic field 311 in the in-plane direction at the nucleation point P1 is increased by the in-plane component Hx of the reproducing magnetic field, and the magnetic field 312 in the in-plane direction at the nucleation point P2 is decreased. Therefore, it is possible to cause the inversion of magnetization of the magnetic domain in the reproducing layer at the nucleation point P1 more easily. With reference to FIG. 9, P3 exists as the nucleation point at which the magnetic field in the in-plane direction is increased. The nucleation point P3 exists within the reproducing spot when the non-recording magnetic domain 303 is subjected to reproduction. Therefore, the inversion of magnetization may occur in the reproducing layer by the trigger of the nucleation point P3. However, this phenomenon can be avoided by deviating the phase of the alternating magnetic field, i.e., by deviating the phase of the magnetic field (reproducing magnetic field) +Hr in the direction to cause the inversion of magnetization in the reproducing layer so that the application timing of the reproducing magnetic field is changed. The reproducing magnetic field is not necessarily applied obliquely with respect to the information-recording medium. Alternatively, it is also preferable that two reproducing magnetic fields may be used to apply the magnetic fields in the x direction and in the y direction respectively.

In the present invention, those usable as a material for constructing the reproducing auxiliary layer include, for example, GdFeCo, GdFe, GdCo, GdDyFe, GdDyCo, Gd-based alloy added with transition metal, transition metal-noble metal alloy, and multilayered film composed of the above.

The information-recording medium of the present invention may be constructed such that the reproducing auxiliary layer contacts with the recording layer. It is preferable that a non-magnetic layer is allowed to intervene between the reproducing auxiliary layer and the reproducing layer. Alternatively, it is also possible that a magnetic layer is allowed to intervene between the reproducing auxiliary layer and the reproducing layer, provided that the magnetic layer is non-magnetic when the recording magnetic domain in the recording layer is transferred to the reproducing layer. The information-recording medium having such a structure is preferably used as a magneto-optical recording medium for MAMMOS. In this case, the reproducing layer can function as a MAMMOS layer (magnetic domain-magnifying reproducing layer).

The information-recording medium of the present invention may be constructed such that the reproducing auxiliary layer contacts with the reproducing layer. In this arrangement, it is preferable that a non-magnetic layer or a magnetic layer which is non-magnetic when the recording magnetic domain in the recording layer is transferred to the reproducing layer is allowed to intervene between the reproducing auxiliary layer and the recording layer. The information-recording medium having such a structure is preferably used as a magneto-optical recording medium for MSR, which is applicable to the FAD (Front Aperture Detection) system, the RAD (Rear Aperture Detection) system, and the CAD (Center Aperture Detection) system.

In the present invention, it is preferable that the reproducing auxiliary layer has a temperature gradient of saturation magnetization of not less than 5 emu/cm$^3$ per 10° C. within a temperature range of 160° C. to 200° C. More preferably, the reproducing auxiliary layer has a temperature gradient of saturation magnetization of not less than 8 emu/cm$^3$ per 10° C. within a temperature range of 100° C. to 160° C. In order to satisfy such a condition, for example, adjustment may be made such that the compensation temperature of the material for constructing the reproducing auxiliary layer is higher than the compensation temperature of the material for constructing the recording layer. In the present invention, the temperature gradient of saturation magnetization means an average temperature gradient of saturation magnetization within a specified temperature range.

According to a seventh aspect of the present invention, there is provided an information-recording medium comprising a recording layer and a reproducing layer, wherein:

the recording layer has a temperature gradient of saturation magnetization of not less than 5 emu/cm$^3$ per 10° C. within a temperature range of 160° C. to 200° C.

In the present invention, the recording layer is constructed by using a material having, in average, a temperature gradient of saturation magnetization of not less than 5 emu/cm$^3$ per 10° C. within a temperature range of 160° C. to 200° C. More preferably, the recording layer has, in average, a temperature gradient of saturation magnetization of not less than 8 emu/cm$^3$ per 10° C. within a temperature range of 100° C. to 160° C. Accordingly, as understood from a distribution D1 of the component in the perpendicular direction of the lack magnetic field shown in FIG. 13, the leak magnetic field in the perpendicular direction from the recording magnetic domain M is suddenly increased from the area outside of the reproducing light beam spot S toward the center. That is, as understood from comparison with a conventional distribution D2 of the perpendicular component of the leak magnetic field, the contrast of the leak magnetic field, which depends on the temperature distribution in the recording layer in the reproducing light beam spot S, is distinct as compared with the conventional one. Therefore, the individual minute magnetic domains in the recording layer are reliably transferred to the reproducing layer. Further, the magnetic domains are easily magnified when the reproducing layer is a magnetic domain-magnifying reproducing layer. On the other hand, when the temperature gradient of saturation magnetization of the recording layer is adjusted, the leak magnetic field in the in-plane direction, which is generated from the recording magnetic domain, is decreased. Therefore, even when any non-recorded magnetic domain exists in the recording layer, the magnetic domain in the reproducing layer, which is located just over the non-recorded magnetic domain, is prevented from inversion which would be otherwise caused by the reproducing magnetic field. The occurrence of nucleation may be also facilitated on the information-recording medium according to the seventh aspect of the present invention by applying the reproducing magnetic field in the in-plane direction or in the oblique direction so that the in-plane component of the magnetic field is added. Those usable as a material for the recording layer which satisfies the foregoing condition include, for example, heavy rare earth-transition metal alloy such as GdTbFeCo, TbFeCo, and TbDyFeCo.

Further, the recording layer may have a two-layered structure composed of a first recording layer and a second recording layer. In this arrangement, the combined magnetization component of the saturation magnetization of the first recording layer and the saturation magnetization of the second recording layer has, in average, a temperature gradient of 5 emu/cm$^3$ per 10° C. within a temperature range of 160° C. to 200° C. For example, when a conventional recording layer material (TbFeCo), which has a temperature dependency of saturation magnetization as shown in FIG. 10, is used for the second recording layer in which the recording magnetic domain is formed, it is preferable that the first recording layer is constructed by using a material, for example, GdFeCo which has a temperature gradient steeper than the temperature gradient of the second recording layer. FIG. 11 shows a temperature dependency of saturation magnetization of a single layer of TbFeCo (second recording layer), a temperature dependency of saturation magnetization of a single layer of GdFeCo (first recording layer) having a film thickness which is a half of that of the TbFeCo layer, and a temperature dependency of saturation magnetization of a combined recording film constructed by them. As understood from the graph shown in FIG. 11, when the two-layered structure is formed by providing the material (GdFeCo) having the steep temperature gradient of saturation magnetization together with the conventional recording layer (TbFeCo) having the gentle temperature gradient of saturation magnetization, it is possible to increase the temperature gradient of saturation magnetization (combined saturation magnetization) in the reproducing temperature area. The value of the saturation magnetization of the combined recording layer in the graph shown in FIG. 11 is represented by an average value determined by being weighted with the film thickness ratio of the TbFeCo layer and the GdFeCo layer.

According to an eighth aspect of the present invention, there is provided a reproducing method on an information-recording medium for reproducing magnetization information of a magnetic domain transferred from a recording layer to a reproducing layer by radiating a reproducing light beam while applying a reproducing magnetic field to the information-recording medium including the recording layer and the reproducing layer, the method comprising:

applying the reproducing magnetic field in an oblique direction to a surface of the information-recording medium.

In the reproducing method of the present invention, in order to apply the reproducing magnetic field in the oblique direction with respect to the surface of the information-recording medium, for example, a magnetic coil for generating the reproducing magnetic field as having been hitherto used may be actively inclined and arranged to apply the reproducing magnetic field so that the direction of the magnetic field generated from the magnetic coil is oblique with respect to the surface of the information-recording medium.

According to a ninth aspect of the present invention, there is provided a reproducing method on an information-recording medium for reproducing magnetization information of a magnetic domain transferred from a recording layer to a reproducing layer by radiating a reproducing light beam while applying a reproducing magnetic field to the information-recording medium including the recording layer and the reproducing layer, the method comprising:

applying the reproducing magnetic field to a surface of the information-recording medium not only in a perpendicular direction but also in an in-plane direction.

In the reproducing method as described above, at least one reproducing magnetic field of the reproducing magnetic field applied in the perpendicular direction and the reproducing magnetic field applied in the in-plane direction may be an alternating magnetic field. When both of the reproducing magnetic field applied in the perpendicular direction and the reproducing magnetic field applied in the in-plane direction are alternating magnetic fields, it is also possible to make adjustment so that at least one of the magnetic field intensity, the magnetic field application timing, and the alternating cycle of the alternating magnetic fields differs. For example, as shown in FIG. 14, the reproducing alternating magnetic field in the in-plane direction is applied to make synchronization with the recording clock used when the recording mark is formed, and the reproducing alternating magnetic field in the perpendicular direction is applied at a cycle which is a half of that of the recording clock. In this process, the reproducing alternating magnetic field is altered so that the in-plane component of the leak magnetic field is increased at each of the leading edge and the trailing edge of the recording mark. When the leading edge and the trailing edge of the recording mark are detected, then the cycle of the reproducing alternating magnetic field in the in-plane direction is synchronized with the recording clock, and thus the in-plane component of the reproducing magnetic field applied thereto can be made mutually different. When the cycle of the reproducing alternating magnetic field in the perpendicular direction is a half of the cycle of the recording clock, the magnetic fields in the recording direction and in the erasing direction, which are perpendicular to the film surface, are applied to each of the leading edge and the trailing edge of the recording mark. Accordingly, the nucleation occurs at the leading edge and the trailing edge of the recording mark, and reproduced signals can be detected from the leading edge and the trailing edge of one recording mark respectively.

According to a tenth aspect of the present invention, there is provided a reproducing apparatus for an information-recording medium, comprising a reproducing magnetic field-generating unit for applying a reproducing magnetic field to the information-recording medium including a perpendicular magnetic recording layer and a reproducing layer, wherein:

the reproducing magnetic field-generating unit is arranged so that the magnetic field is generated in an oblique direction with respect to a magnetization direction of the perpendicular magnetic recording layer.

In the reproducing apparatus of the present invention, it is preferable that the reproducing magnetic field-generating unit has its axis of magnetic field generation which is arranged so that the magnetic field is generated in the oblique direction with respect to the direction of magnetization of the recording layer of the information-recording medium.

Alternatively, the reproducing magnetic field-generating unit may be arranged such that its axis of magnetic field generation is parallel to the optical axis of the reproducing light beam, and the axis of magnetic field generation is disposed at a position deviated from the optical axis of the reproducing light beam in the in-plane direction of the information-recording medium. Alternatively, the reproducing magnetic field-generating unit may be arranged such that the axis of magnetic field generation of the reproducing magnetic field-generating unit obliquely intersects the optical axis of the reproducing light beam in the information-recording medium.

According to an eleventh aspect of the present invention, there is provided a reproducing apparatus for an information-recording medium, comprising a reproducing magnetic field-generating unit for applying a reproducing magnetic field to the information-recording medium including a perpendicular magnetic recording layer and a reproducing layer, the reproducing magnetic field-generating unit including:

a first magnetic field-generating unit for generating a magnetic field in a perpendicular direction with respect to a surface of the information-recording medium; and a second magnetic field-generating unit for generating a magnetic field in an in-plane direction with respect to the surface of the information-recording medium.

The reproducing apparatus of the present invention includes the second magnetic field-generating unit which makes it possible to generate the magnetic field in the in-plane direction. Therefore, it is easy to cause the inversion of magnetization in the reproducing layer of the information-recording medium. The second magnetic field-generating unit may be constructed, for example, by using a permanent magnet or a single magnetic pole type magnetic field-generating unit (electromagnet) comprising a magnetic coil wound around a columnar magnetic core. When the second magnetic field-generating unit is constructed by using the single magnetic pole type magnetic field-generating unit, the reproducing magnetic field in the in-plane direction, which is generated from the magnetic field-generating unit, may be either an alternating magnetic field or a direct current magnetic field. The magnetic field intensity and the application timing of the reproducing magnetic field generated from the second magnetic field-generating unit, and the alternating cycle in the case of the alternating magnetic field may be appropriately adjusted so that they are different from those of the first magnetic field-generating unit.

The reproducing apparatus of the present invention may include a lens for collecting and radiating the reproducing light beam onto the information-recording medium. The lens may be a high NA lens having an NA (numerical aperture) of not less than 0.5, preferably not less than 0.6. More preferably, the reproducing apparatus of the present invention includes a solid immersion lens. The use of the solid immersion lens effectively increases the numerical aperture of the lens. Therefore, it is possible to decrease the light spot diameter. Accordingly, information recorded at a super high density can be reproduced. When the high NA lens and/or the solid immersion lens is used, it is preferable that at least one of the first and second magnetic field-generating units is installed under or around the high NA lens or the solid immersion lens.

BRIEF DESCRIPTION OF THE DRAWINGS

FIGS. 6A and 6B show a specified document of a magnetic head capable of reproducing information by introducing a recording light beam from a side opposite to a substrate, wherein FIG. 6A shows a longitudinal sectional view illustrating the magnetic head, and FIG. 6B shows the magnetic head as viewed from a side of the bottom.

DESCRIPTION OF THE PREFERRED EMBODIMENTS

Embodiments of the present invention will be specifically explained below with reference to the drawings.

First Embodiment

This embodiment is illustrative of the recording method and the recording apparatus according to the present invention.

Figure 1:
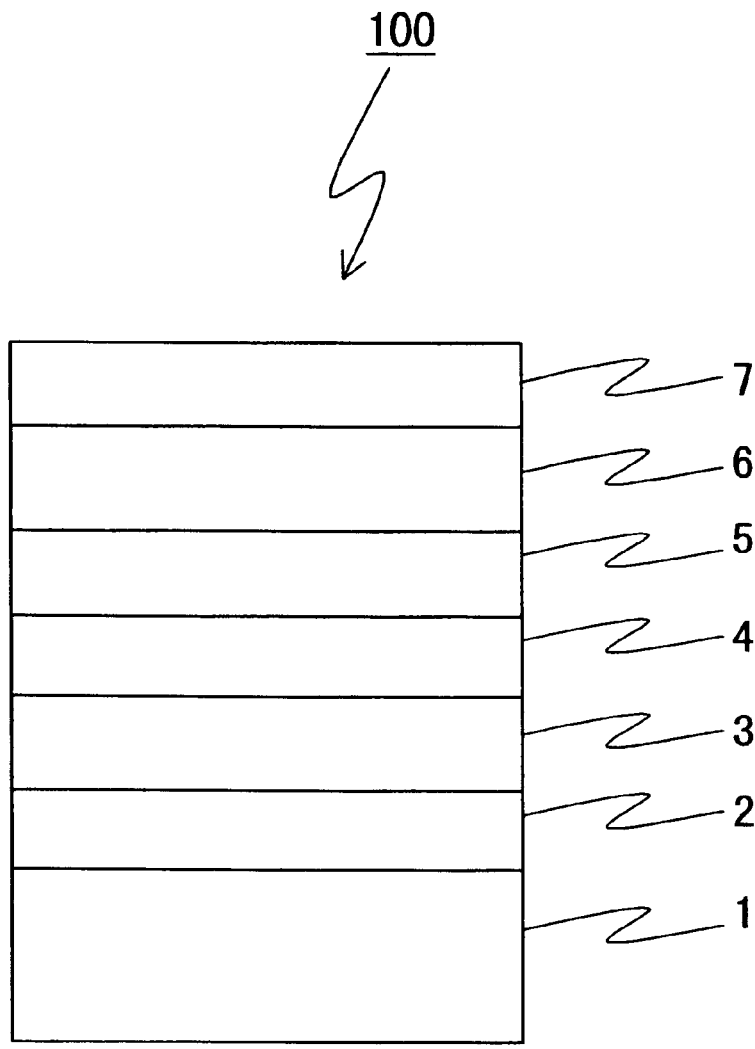
FIG. 1 schematically shows a cross-sectional structure of an information-recording medium described in an embodiment.

FIG. 1 shows a cross-sectional structure of a specified embodiment of the magneto-optical recording medium on which information is recorded in accordance with the recording method of the present invention. The magneto-optical recording medium 100 has a structure comprising a dielectric layer 2, a reproducing layer 3, a non-magnetic layer 4, a recording auxiliary layer 5, a recording layer 6, and a protective layer 7 which are successively stacked on a transparent substrate 1.

In the structure shown in FIG. 1, an arbitrary substrate having the light-transmissive property can be used for the transparent substrate 1. Those usable for the transparent substrate 1 include, for example, a substrate obtained by shaping a transparent resin material such as polycarbonate and amorphous polyolefins into a desired shape, and a substrate in which a transparent resin film transferred with a desired preformat pattern is tightly adhered to one surface of a glass plate formed to have a desired shape.

The dielectric layer 2 is a layer which is provided in order to cause multiple interference of a reproducing light beam in the layer so that the Kerr rotation angle detected from the magneto-optical recording medium is substantially increased. The dielectric layer 2 can be formed by using a material having a large refractive index as compared with the transparent substrate 1, for example, an inorganic dielectric composed of SiN. The protective layer 7 is a layer which is provided in order that the film members 3 to 6, which are stacked between the transparent substrate 1 and the protective layer 7, are protected from chemical harmful influences such as corrosion. The protective layer 7 is composed of, for example, an SiN film or a carbon film. The non-magnetic layer 4 is a layer which is provided in order to break the exchange coupling between the reproducing layer 3 and the recording auxiliary layer 5. The non-magnetic layer 4 can be constructed by using, for example, a non-magnetic dielectric or a non-magnetic metal.

The recording auxiliary layer 5 is a perpendicularly magnetizable film which has perpendicular magnetic anisotropy smaller than perpendicular magnetic anisotropy of the recording layer 6. The recording auxiliary layer 5 can be constructed by using, for example, GdFeCo. The recording layer 6 is a perpendicularly magnetizable film which exhibits perpendicular magnetic anisotropy at a temperature of not less than the room temperature. Those most preferably used for the recording layer 6 include, for example, amorphous alloy of rare earth and transition metal such as TbFeCo, DyFeCo, and TbDyFeCo. It is also possible for the recording layer 6 to use other known magneto-optical recording materials such as an alternating stacked material composed of Pt film and Co film, and a garnet-based oxide magnetic material. The reproducing layer 3 can be constructed by using a magnetic material, for example, GdFeCo which has a large Kerr rotation angle than that of the material for constructing the recording layer 6.

The dielectric layer 2, the reproducing layer 3, the non-magnetic layer 4, the recording auxiliary layer 5, the recording layer 6, and the protective layer 7 can be formed, for example, by means of a dry process such as continuous sputtering based on the use of a magnetron sputtering apparatus.

Figure 2:
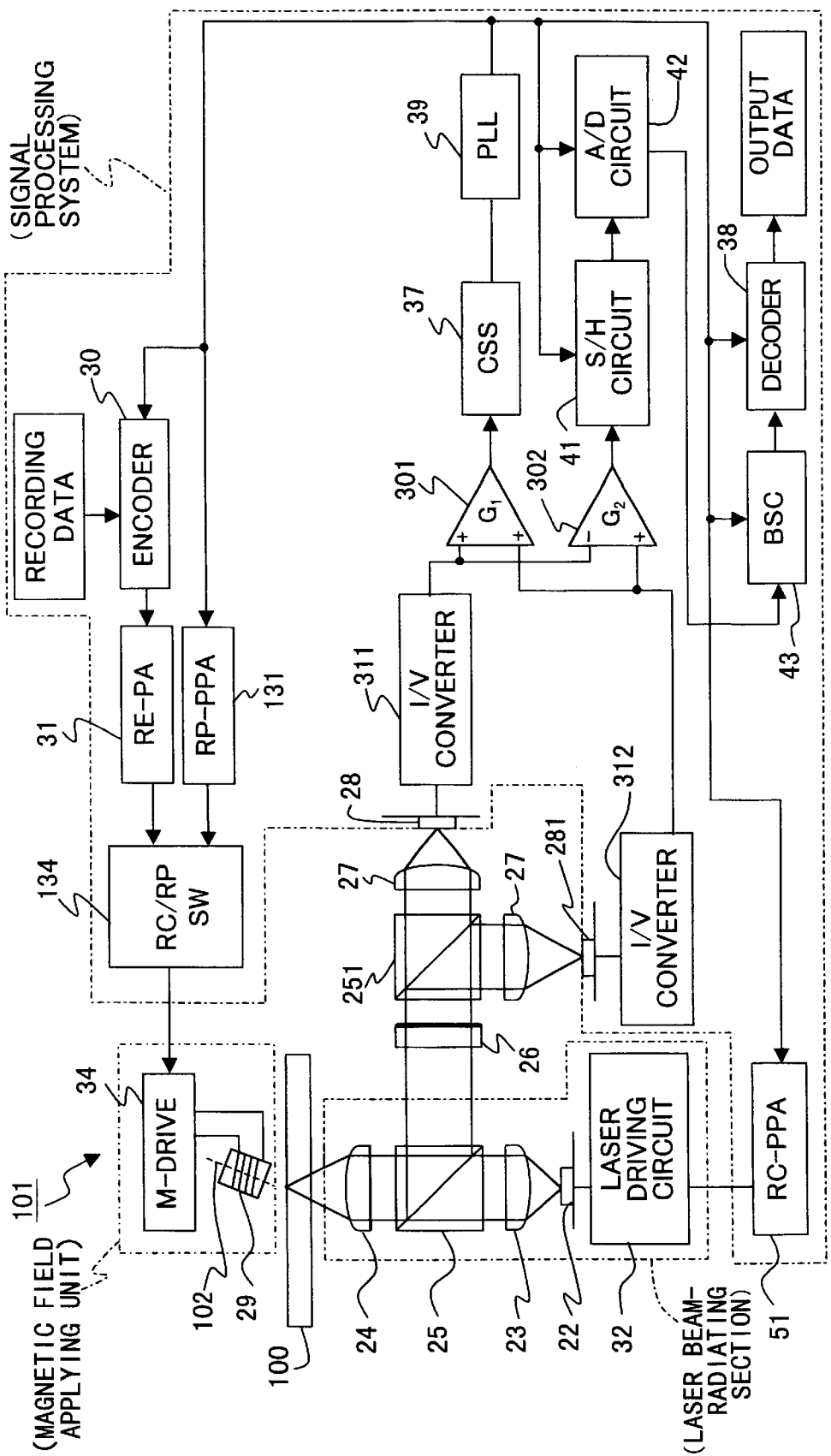
FIG. 2 shows a schematic arrangement of a recording and reproducing apparatus according to the present invention.

Next, explanation will be made for a recording and reproducing apparatus for recording information on the magneto-optical recording medium 100. FIG. 2 shows a schematic arrangement of the recording and reproducing apparatus according to the present invention. The recording and reproducing apparatus 101 principally comprises a laser beam-radiating section for radiating a pulsed light beam at a constant cycle synchronized with code data onto the magneto-optical recording medium 100, a magnetic field-applying unit for applying a controlled recording magnetic field or a controlled reproducing magnetic field to the magneto-optical recording medium 100 during recording or reproduction, and a signal processing system for detecting and processing a signal from the magneto-optical recording medium 100. The laser beam-radiating section includes a laser 22 which is connected to a laser driving circuit 32 and a recording pulse width/phase-adjusting circuit (RC-PPA) 51. The laser-driving circuit 32 receives a signal from the recording pulse width/phase-adjusting circuit 51 to control the laser pulse width and the phase of the laser 22. The recording pulse width/phase-adjusting circuit 51 receives a clock signal from a PLL circuit 39 as described later on, and it adjusts the phase and the pulse width of the recording light beam.

The magnetic field-applying unit includes a magnetic coil 29 for applying the magnetic field to the medium 100. The magnetic coil 29 is connected to a magnetic coil-driving circuit 34. The magnetic field-applying unit is arranged such that the axis of magnetic field generation 102 thereof is oblique with respect to the surface of the magneto-optical recording medium 100, and the geometrically projected component of the axis of magnetic field generation 102 onto the medium surface is parallel to the direction of the track existing in an area of the magneto-optical recording medium 100 irradiated with the laser beam. In this context, the axis of magnetic field generation 102 corresponds to the central axis of the magnetic core of the magnetic coil 29 around which the coil is wound. During the recording, the magnetic coil-driving circuit (M-DRIVE) 34 receives input data from an encoder 30 into which the data is inputted, via a phase-adjusting circuit (RE-PA) 31 to control the magnetic coil 29. On the other hand, during the reproduction, the magnetic coil-driving circuit (M-DRIVE) 34 receives the clock signal from the PLL circuit 39 as described later on, to adjust the phase and the pulse width by the aid of a reproducing pulse width/phase-adjusting circuit (RP-PPA) 131, and then it controls the magnetic coil 29. In order to switch the signal to be inputted into the magnetic coil-driving circuit 34 between the recording process and the reproduction process, a recording/reproduction selector (RC/RP SW) 134 is connected to the magnetic oil-driving circuit 34.

The laser beam-radiating section includes a collimator lens 23, a first polarizing prism 25, and an objective lens 24 which are arranged between the laser 22 and the magneto-optical recording medium 100. A second polarizing prism 251 and detectors 28, 281 are arranged on the side of the prism 25. The signal processing system includes the detectors 28, 281 both of which are connected to a subtractor (G2) 302 and an adder (G1) 301 via I/V converters 311, 312 respectively. The adder 301 is connected to the PLL circuit 39 via a clock-sampling circuit (CSS) 37. The subtractor 302 is connected to a decoder 38 via a sample hold circuit (S/H circuit) 41 for holding the signal in synchronization with the clock, an A/D converter circuit (A/D circuit) 42 for performing analog/digital conversion in synchronization with the clock in the same manner as described above, and a binary signal processing circuit (BSC) 43.

In the apparatus constructed as described above, the light beam, which is radiated from the laser 22, is made into a parallel light beam by the aid of the collimator lens 23. The light beam passes through the polarizing prism 25, and it is collected onto the magneto-optical recording medium 100 by the aid of the objective lens 24. The reflected light beam from the magneto-optical recording medium 100 is directed by the polarizing prism 25 in the direction toward the polarizing prism 25. The light beam it transmitted through a half-wavelength plate 26, and then it is divided by the polarization prism 251 into those directed in two directions. The divided light beams are collected by detection lenses 27 respectively, and they are introduced into the photodetectors 28, 281 respectively. In this embodiment, pits are previously formed on the magneto-optical recording medium 100 for generating the tracking error signal and the clock signal. The signal, which represents the reflected light beam from the clock signal-generating pits, is detected by the detectors 28, 281, and then it is sampled by the clock-sampling circuit 37. Subsequently, the data channel clock is generated by the PLL circuit 39 which is connected to the clock-sampling circuit 37.

When the data is recorded, the laser 22 is light-modulated at a constant frequency to make synchronization with the data channel clock by the aid of the laser-driving circuit 32. A continuous pulse light beam having a narrow width is radiated to locally heat, at equal intervals, the data-recording area of the rotating magneto-optical recording medium 100. The data channel clock controls the encoder 30 of the signal processing system to generate a data signal having a reference clock cycle. The data signal is sent to the magnetic coil-driving unit 34 via the phase-adjusting circuit (RE-PA) 31. The magnetic coil-driving unit 34 controls the magnetic coil 29 so that the magnetic field having a polarity corresponding to the data signal is applied to the heated portion of the data-recording area of the magneto-optical recording medium 100.

Next, explanation will be made in further detail below for a method for recording information on the magneto-optical recording medium 100 by using the recording and reproducing apparatus 101 constructed as described above.

This embodiment is illustrative of a case in which the signal is subjected to magnetic field modulation recording by applying the external magnetic field (recording magnetic field) modulated in response to the recording signal, while radiating the recording light beam modulated by the clock cycle to have the pulse-shaped configuration, onto the magneto-optical recording medium 100. It is assumed that the direction of magnetization is aligned in a certain direction (upward direction in FIG. 1) as an initial state in the recording layer of the magneto-optical recording medium 100 shown in FIG. 1. The magneto-optical recording medium 100 in such a state is placed on a turn table (not shown) of the recording and reproducing apparatus 101 shown in FIG. 2. The laser beam-radiating section is arranged on the side of the substrate 1, and the magnetic coil 29 is arranged on the side of the protective film 7. The turn table is driven by a medium-driving section (not shown) to rotate the magneto-optical recording medium 100 at a predetermined linear velocity with respect to the laser beam-radiating section and the magnetic coil 29. Subsequently, the laser beam-radiating section and the magnetic coil 29 are positioned for a predetermined track to be subjected to the recording, and then the recording signal is recorded. For example, a semiconductor laser can be used as the recording light beam.

When the recording signal is recorded, the external magnetic field (recording magnetic field) is applied from the magnetic coil 29 to the magneto-optical recording medium 100 by inputting the signal into the magneto field-generating unit in synchronization with the recording clock. After the external magnetic field is switched to have a predetermined value, the modulated light pulse is radiated by using the laser beam-radiating section so that each of the magnetic layers corresponding to the light pulse-irradiated portion of the magneto-optical recording medium 100 is instantaneously heated to a temperature (recording temperature) at which the magnetization can be inverted by the aid of the external magnetic field. The external magnetic field, which is applied in the oblique direction to the medium, includes not only the perpendicular component but also the in-plane component. Therefore, the in-plane component causes the nucleation also in a minute area in the recording auxiliary layer heated by the recording light beam, in which the inversion of magnetization takes place (seed magnetic domain is generated) prior to the magnetization of the recording layer. Subsequently, the nucleation takes place in a minute area in the recording layer disposed just over the seed magnetic domain generated in the recording auxiliary layer as described above. Thus, the speed magnetic domain is also generated in the recording layer. The seed magnetic domain in the recording layer serves as a trigger, and the magnetization in a predetermined area which is formed on the basis of the temperature distribution in the recording layer is gradually inverted by the aid of the perpendicular component of the recording magnetic field. After that, the recording light beam spot is moved from the area of inversion of magnetization in the recording layer. When the concerning area is cooled, the magnetic domain in the area is settled in a stable state while maintaining the inverted state. Thus, the minute recording magnetic domain is formed at the light pulse-irradiated portion of the recording layer. The minute magnetic domain (recording mark), which is formed in the recording layer, is extremely clear, and it has good symmetry.

In the signal recording process based on the magnetic field intensity modulation system described above, the laser beam is radiated while being modulated to have the pulse-shaped configuration at the constant cycle. Alternatively, it is also possible to radiate the laser beam while further providing a plurality of changes in intensity in one pulse, or it is also possible to radiate the laser beam with continuous light at a constant intensity.

As explained above, information can be recorded on the magneto-optical recording medium having the stacked structure shown in FIG. 1 by using the recording and reproducing apparatus of the present invention. When the recorded information is reproduced, the recording magnetic domain in the recording layer is transferred to the reproducing layer by irradiating the medium with the reproducing light beam to reproduce the information from the reproducing layer. The magnetic material, which constitutes the reproducing layer, has the Kerr rotation angle larger than that of the recording layer. Therefore, the information can be reproduced with the large signal intensity.

In the magneto-optical recording medium described above, the reproducing layer may be allowed to function as a mask layer. Alternatively, a mask layer may be allowed to intervene between the reproducing layer and the recording layer. Thus, the reproducing resolution can be improved by means of the MSR (magnetically induced super resolution) technique to reproduce the information.

The reproducing layer may be allowed to function as a magnetic domain-magnifying reproducing layer on the basis of the principle of MAMMOS (Magnetic Amplifying Magneto-Optical System) contrived by the present inventors. Thus, the minute recording magnetic domain in the recording layer can be transferred and magnified in the magnetic domain-magnifying reproducing layer while applying the reproducing magnetic field. Therefore, the combination of the MAMMOS and the recording method of the present invention for applying the recording magnetic field in the oblique direction with respect to the medium is an extremely effective combination, because the minute recording magnetic domain can be recorded at the high density by using the controlled method, and the information can be reproduced with the sufficient reproduced signal intensity. The principle of MAMMOS is described in detail in International Publication No. WO98/02878. Therefore, reference may be made thereto.

Second Embodiment

Next, explanation will be made specifically for embodiments of the magneto-optical recording medium, the reproducing method thereon, and the reproducing apparatus therefor according to the present invention.

Figure 7:
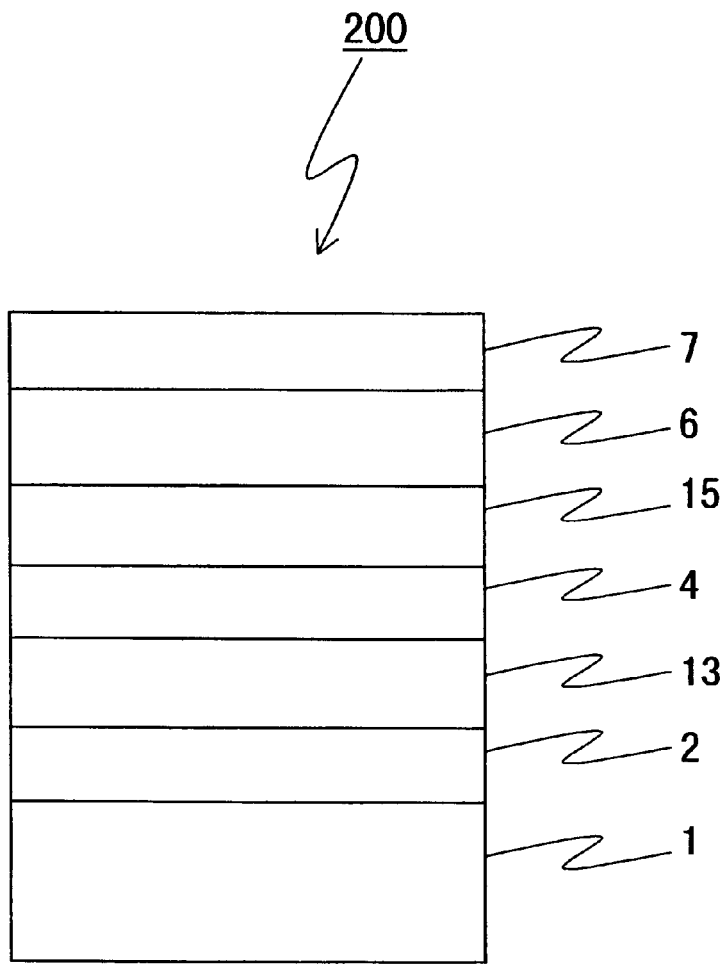
FIG. 7 schematically shows a cross-sectional structure of a specified embodiment of the information-recording medium according to the present invention.
Figure 8A:
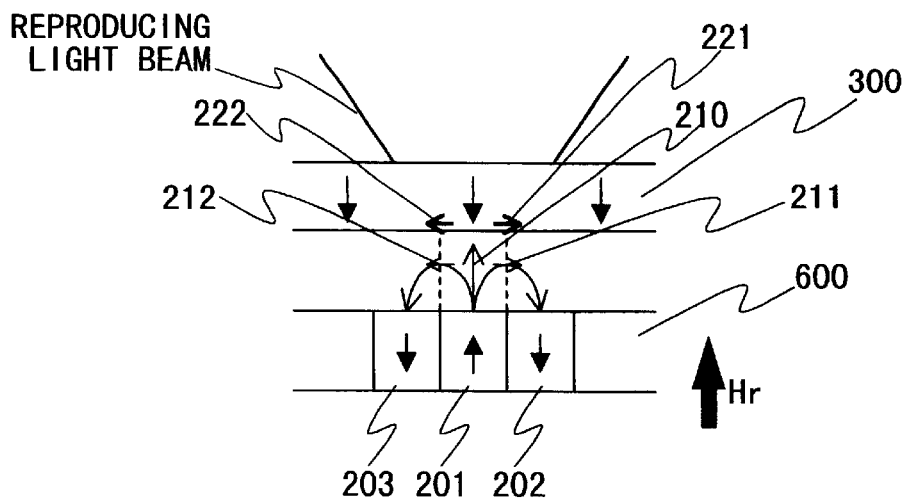
FIGS. 8A, 8B and 8C explain the process of occurrence of inversion of magnetization in a recording layer when a reproducing magnetic field is applied.
Figure 8B:
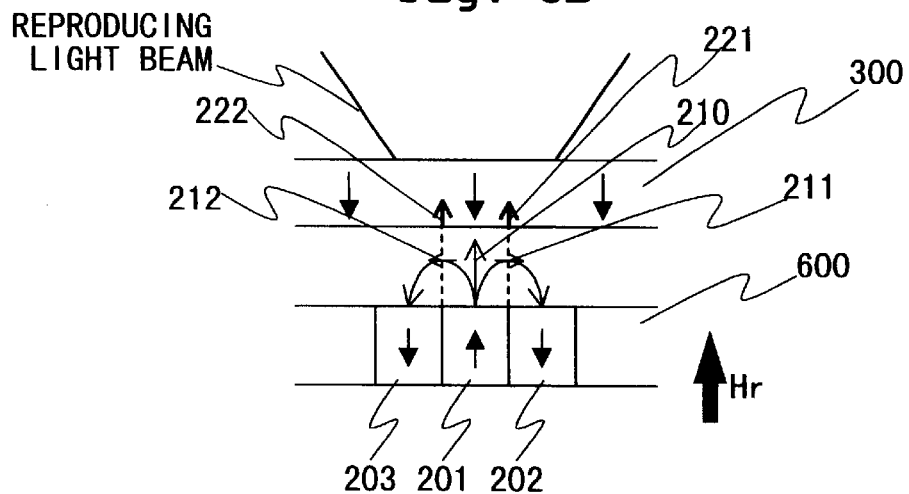
Figure 8C:
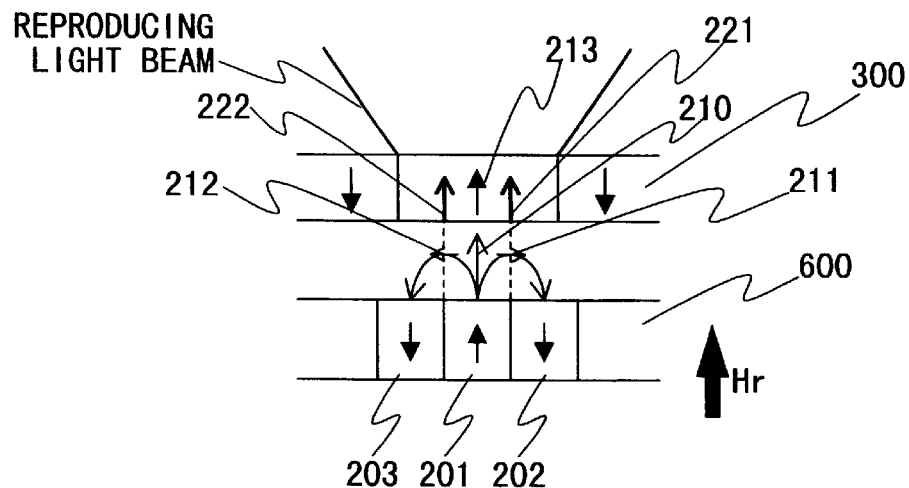
Figure 9:
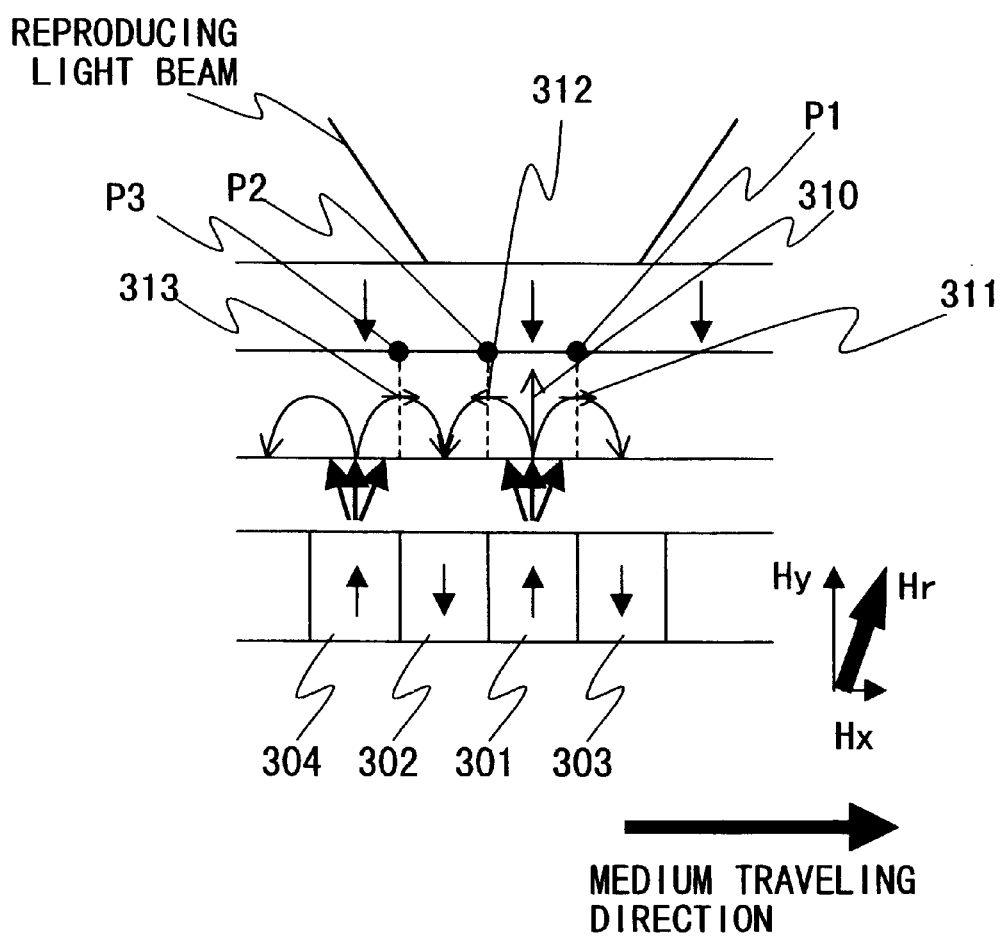
FIG. 9 explains a situation in which a reproducing magnetic field having a magnetic field component in the in-plane direction is applied to the medium.
Figure 10:
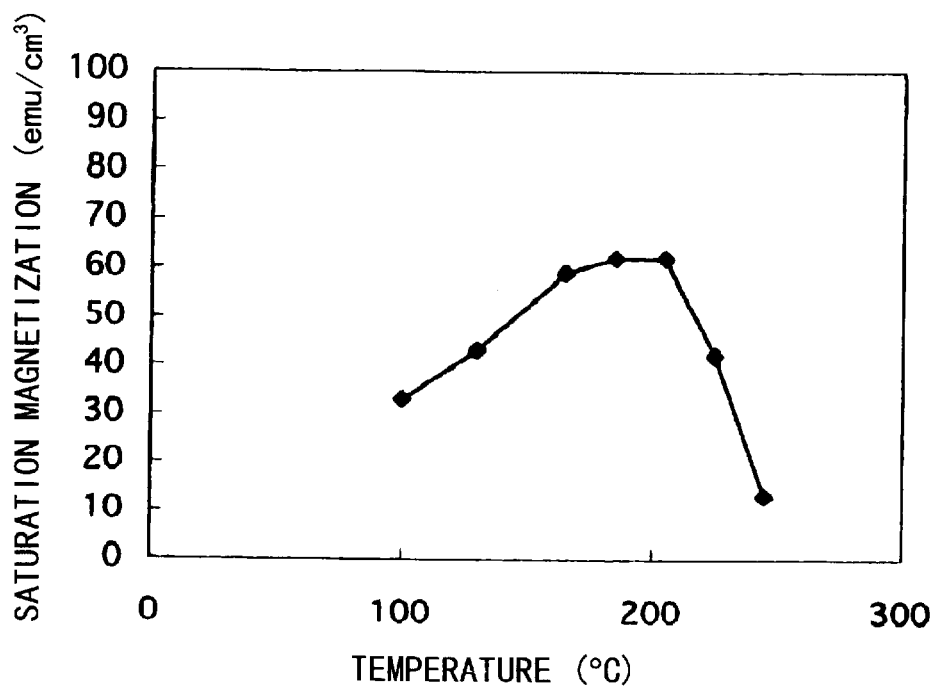
FIG. 10 shows a graph illustrating the temperature dependency of saturation magnetization of TbFeCo used for the conventional recording layer.
Figure 11:
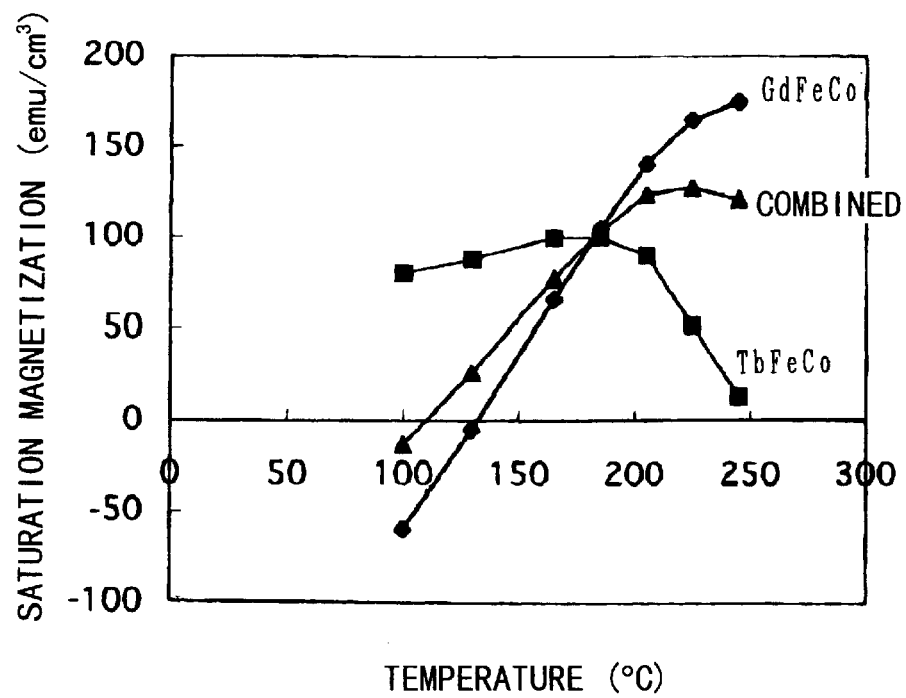
FIG. 11 shows the temperature dependency of combined saturation magnetization of a recording layer having a two-layered structure composed of a GdFeCo layer and a TbFeCo layer.

FIG. 7 shows a cross-sectional structure of an embodiment of the magneto-optical recording medium according to the present invention. The magneto-optical recording medium 200 has a structure comprising a dielectric layer 2, a magnetic domain-magnifying reproducing layer 13, a non-magnetic layer 4, a reproducing auxiliary layer 15, a recording layer 6, and a protective layer 7 which are successively stacked on a transparent substrate 1.

In the structure shown in FIG. 7, the transparent substrate 1, the dielectric layer 2, the non-magnetic layer 4, the recording layer 6, and the protective layer 7 are the same as those of the magneto-optical recording medium 200 described in the first embodiment, detailed explanation of which will be omitted.

With reference to FIG. 7, the magnetic domain-magnifying reproducing layer 13 can be constructed by using a material, for example, GdFeCo which may be used for a magnetic domain-magnifying reproducing layer for MAMMOS. The reproducing auxiliary layer 15 is a perpendicularly magnetizable film having perpendicular magnetic anisotropy smaller than perpendicular magnetic anisotropy of the recording layer 6. The reproducing auxiliary layer 15 can be constructed by using, for example, GdFeCo.

The magnetic domain-magnifying reproducing layer 13 and the reproducing auxiliary layer 15 can be formed, for example, by means of a dry process such as continuous sputtering based on the use of a magnetron sputtering apparatus, in the same manner as in the first embodiment.

The recording and reproducing apparatus 101 described in the first embodiment can be used as a reproducing apparatus for reproducing information recorded on the magneto-optical recording medium 200 as described above. A method for performing reproduction on the magneto-optical recording medium 200 by using the recording and reproducing apparatus 101 will be explained in more detail below.

Figure 12:
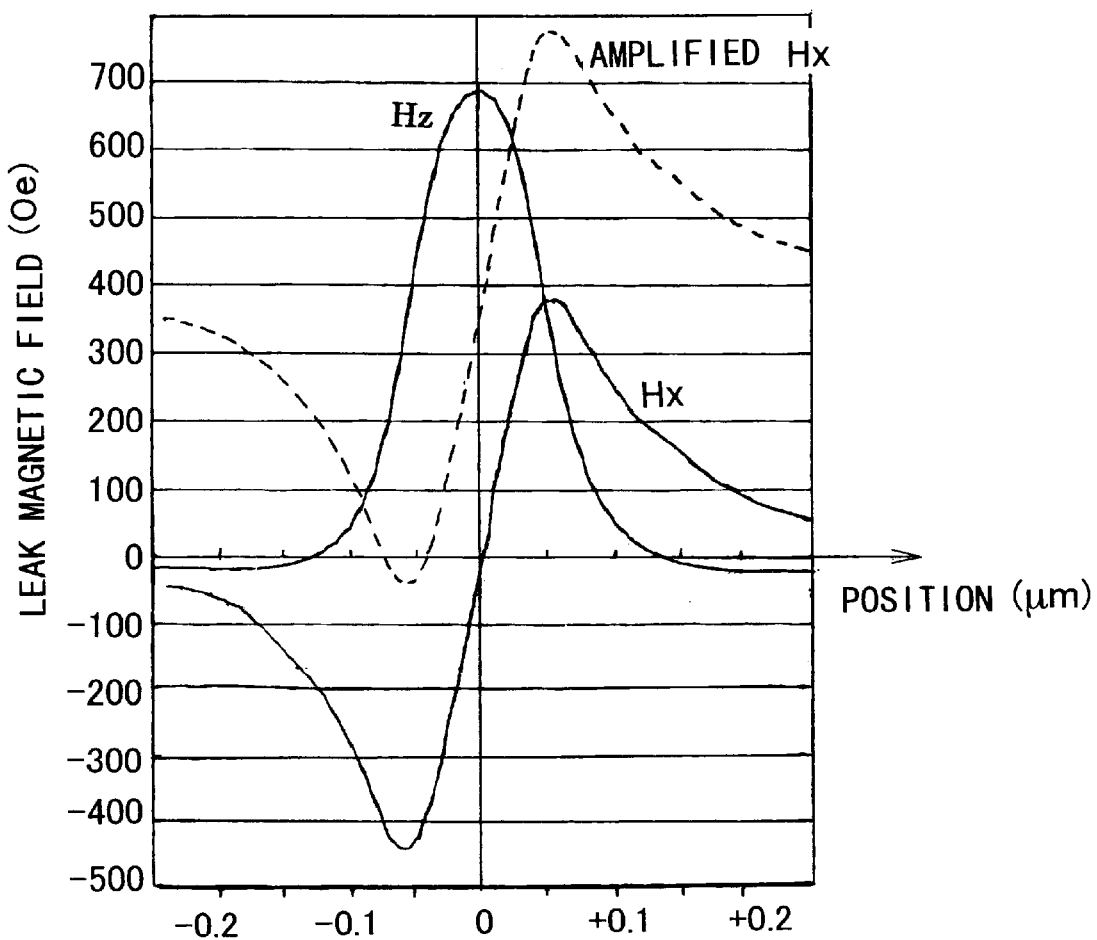
FIG. 12 shows a graph illustrating magnetic field distributions in the in-plane direction and in the perpendicular direction of the leak magnetic field from the recording magnetic domain having a crescent moon shape.
Figure 12:
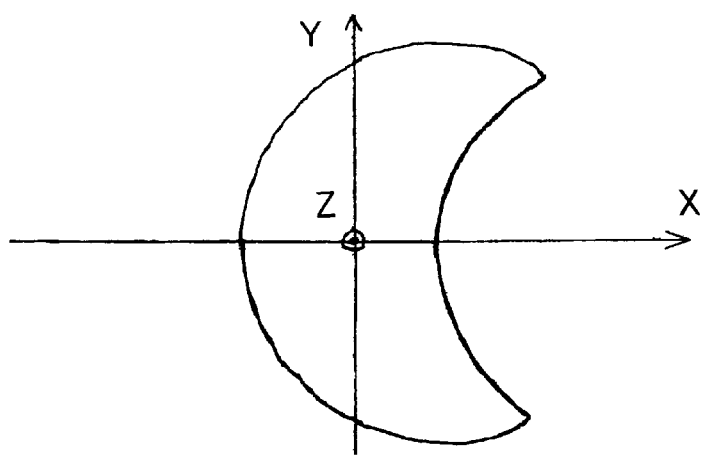
Figure 13:
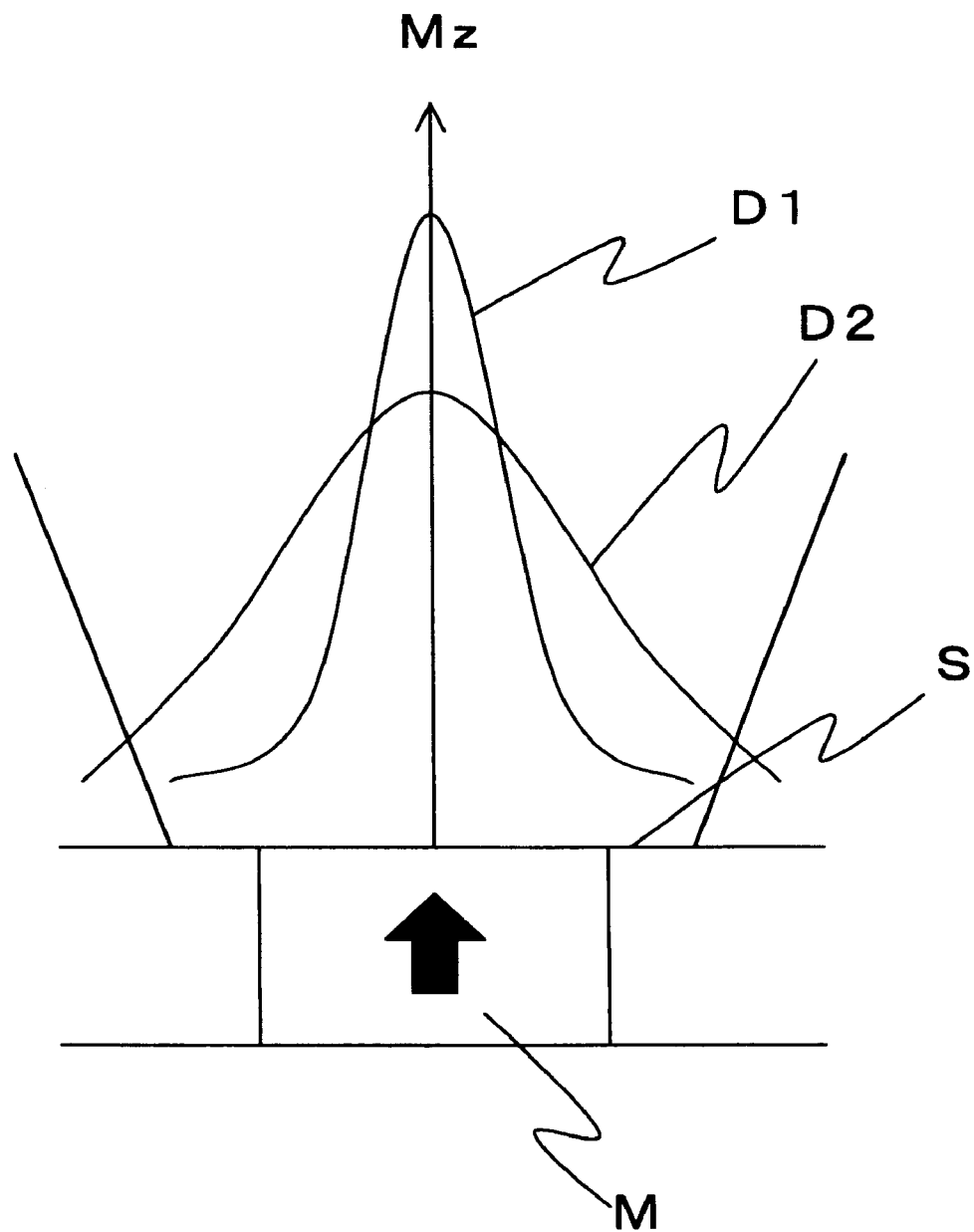
FIG. 13 shows distributions of the perpendicular component of the leak magnetic field from the recording magnetic domain formed in a recording layer.

At first, the magneto-optical recording medium 200 is charged to the recording and reproducing apparatus 101 shown in FIG. 2 so that the substrate is disposed on the lower side, i.e., the reproducing light beams comes into the magneto-optical recording medium 200 from the side of the substrate. It is assumed that a crescent moon-shaped recording magnetic domain as shown in a lower part of FIG. 12 is formed in the recording layer of the magnetor-optical recording medium 200. A leak magnetic field is generated from the recording magnetic domain having such a shape, at a magnetic field intensity as shown in a graph in an upper part of FIG. 12. In FIG. 12, a magnetic field component in the Z direction (direction perpendicular to the plane of paper) of the leak magnetic field generated from the recording magnetic domain is represented by Hz, and a magnetic field component in the X direction, i.e., in the in-plane direction (horizontal direction of the plane of paper) of the leak magnetic field is represented by Hx. The distribution of the magnetic field shown in the graph of FIG. 12 is determined by simulation from the shape of the recording magnetic domain. It is assumed that the Z direction which is positive with respect to the recording magnetic domain is the recording direction. As understood from FIG. 12, the leak magnetic field component Hx in the in-plane direction (linear direction) is about −430 [Oe] to +380 [Oe] (about −33970 [A/m] to about +30030 [A/m]). The reproducing magnetic field Hr is now applied by using the magnetic coil 29 of the reproducing apparatus 101 shown in FIG. 2 so that a magnetic field of +400 [Oe] (about +31600 [A/m]) is applied to the in-plane component of the reproducing magnetic field. Accordingly, as shown by a broken line in the graph of FIG. 12, the in-plane component Hx of the leak magnetic field from the recording magnetic domain is amplified in the positive direction (+x direction), and it is decreased in the negative direction (-x direction). The nucleation takes place in a minute area in the reproducing layer which is applied with the amplified in-plane leak magnetic field Hx. Thus, the seed magnetic domain, which is subjected to the inversion of magnetization, is generated. The seed magnetic domain, which has been subjected to the inversion of magnetization is magnified by the perpendicular component Hz of the reproducing magnetic field, and it is expanded to a size of the reproducing light beam spot. The alternating magnetic field is used for the reproducing magnetic field. Therefore, the magnetic domain can be transferred and the magnetic domain can be magnified by using the magnetic field in the +Hz direction, and the magnified magnetic domain can be extinguished by using the magnetic field in the −Hz direction. Further, the generation of the seed magnetic domain, which occurs at a certain place in the magnetic domain-magnifying reproducing layer by the aid of the increased leak magnetic field Hx in the in-plane direction, can be concentrated on one place by regulating the magnetic field generation timing in the +Hz direction of the alternating magnetic field. When the non-recorded magnetic domain is present within the reproducing light beam spot, it is possible to effectively avoid the generation of any seed magnetic domain in the magnetic domain-magnifying reproducing layer, which would be otherwise caused by the influence of the leak magnetic field Hx from the adjoining recording magnetic domain and the perpendicular component Hz of the reproducing magnetic field. Thus, the minute recording magnetic domain in the recording layer is transferred to the magnifying reproducing layer, and it is magnified. An amplified reproduced signal can be obtained from the magnified magnetic domain in the magnifying reproducing layer. Therefore, the recorded information can be reproduced at high C/N.

Third Embodiment

Figure 15:
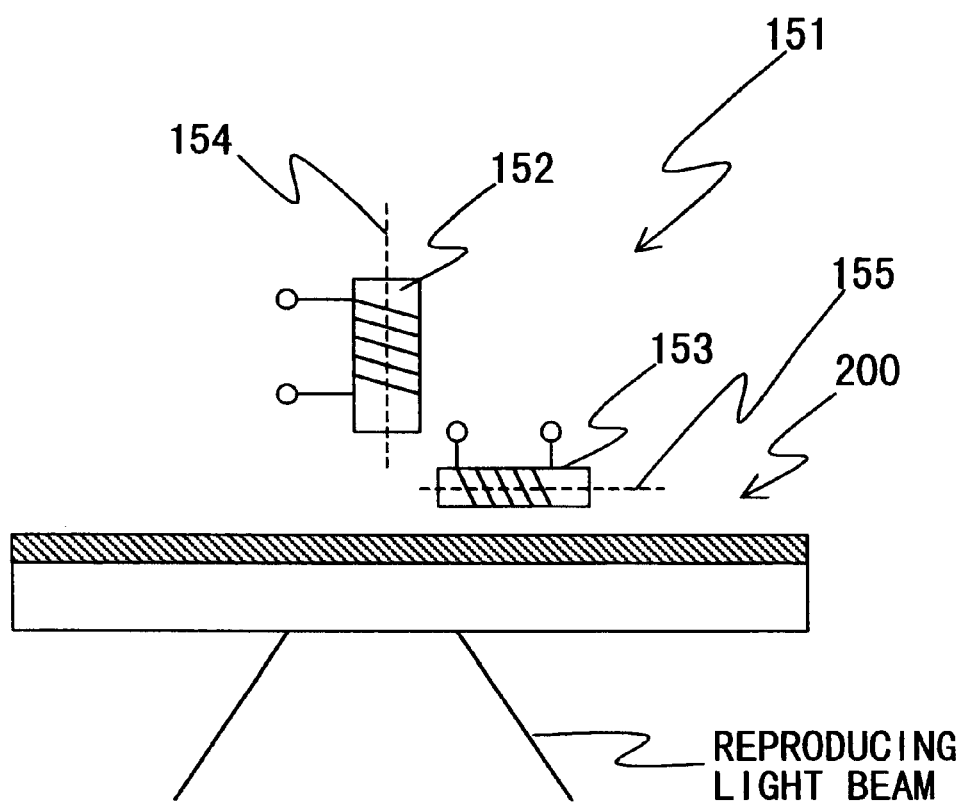
FIG. 15 schematically explains an arrangement of a magnetic field-generating unit comprising a perpendicular magnetic coil for generating a reproducing magnetic field in the perpendicular direction and an in-plane magnetic coil for generating a reproducing magnetic field in the in-plane direction with respect to a magneto-optical recording medium.

Next, explanation will be made for a method for reproducing information by using, in place of the magnetic field-generating unit shown in FIG. 2, a magnetic field-generating unit 151 as shown in FIG. 15 comprising a perpendicular magnetic coil 152 having an axis of magnetic field generation 154 which is in the perpendicular direction with respect to the film surface of the magneto-optical recording medium 200, and an in-plane magnetic coil 153 having an axis of magnetic field generation 155 which is parallel to the film surface of the magneto-optical recording medium 200 and which is in the same direction as that of the track existing in the area irradiated with the reproducing light beam. The magneto-optical recording medium 200 in the same as the magneto-optical recording medium for MAMMOS used in the second embodiment. In the case of the magnetic field-generating unit 151 having the structure shown in FIG. 15, the magnetic field, which is oblique with respect to the film surface, is applied to the magneto-optical recording medium 200 by means of a combined magnetic field of the magnetic field from the perpendicular magnetic coil 152 and the magnetic field from the in-plane magnetic oil 153. Both of the perpendicular magnetic coil 152 and the in-lane magnetic coil 153 are capable of generating the alternating magnetic fields. For example, the magnetic field intensity, the magnetic field application timing, and the alternating cycle can be independently controlled respectively. In this embodiment, adjustment is made so that the alternating cycle of the in-plane magnetic coil 153 is synchronized with the recording clock. Further, alignment is made so that the alternating cycle of the perpendicular magnetic coil 152 is ½ of the recording clock.

Figure 14:
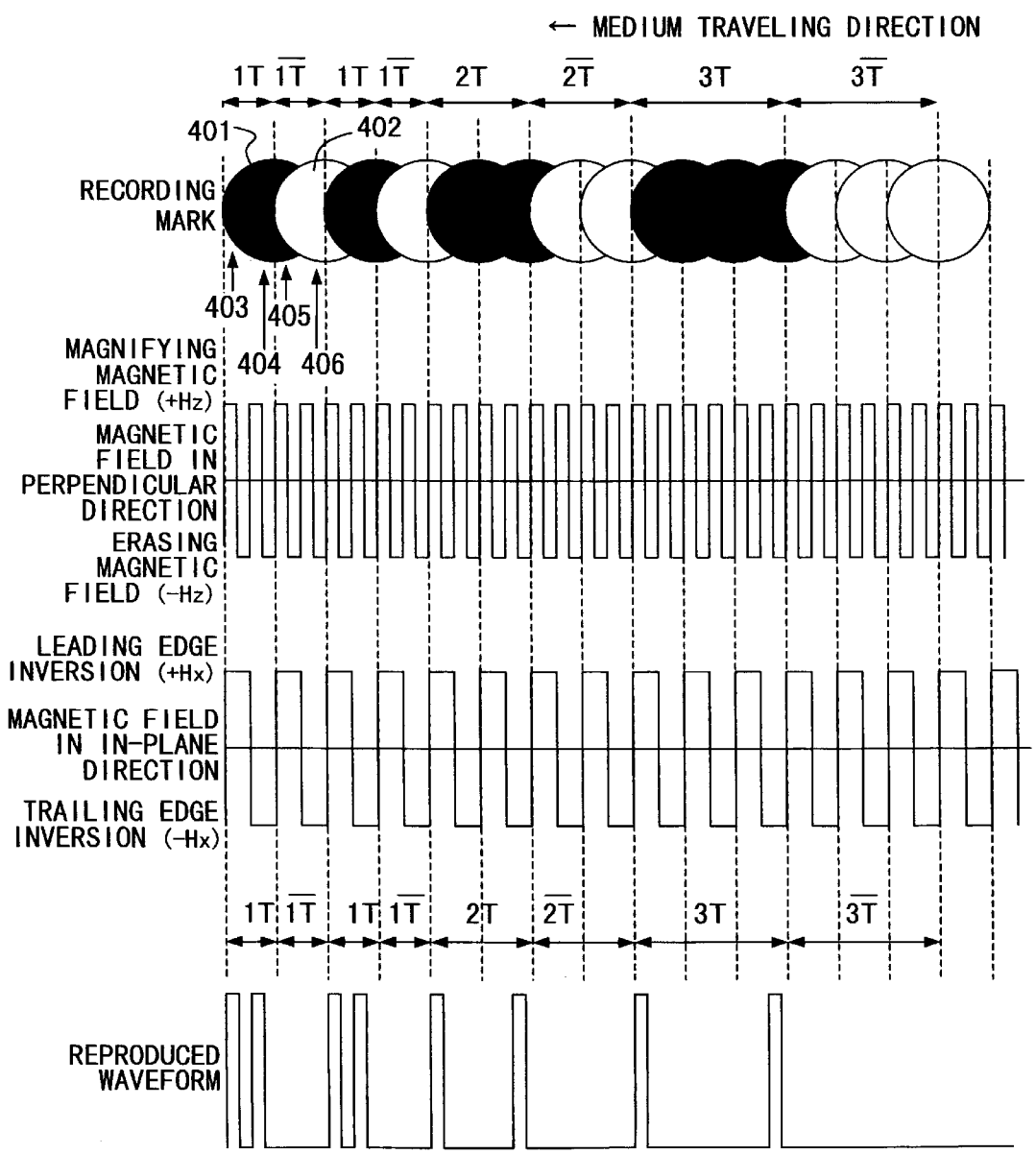
FIG. 14 schematically shows a recording mark array recorded in a recording layer, timing charts for application of an in-plane reproducing magnetic field and a perpendicular reproducing magnetic field, and a reproduced single obtained thereby.

FIG. 14 shows a recording mark array formed in the recording layer, timing charts of the perpendicular magnetic field and the in-plane magnetic field applied when the recording mark array is reproduced, and a reproduced waveform obtained thereby. As shown in FIG. 14, reproduced signals can be detected from the leading edge and the trailing edge of each of the recording marks respectively by applying the perpendicular magnetic field and the in-plane magnetic field at the timing as described above. In this embodiment, one end (edge) of the recording mark, which firstly enters the light spot when the recording mark is relatively moved with respect to the light spot, is referred to as the leading edge, and the other end of the recording mark is referred to as the trailing edge. In FIG. 14, the left edge of the recording mark is the leading edge. In FIG. 14, the leftward direction in the drawing is the positive direction of the in-plane magnetic field (+Hx). The leak magnetic field at the leading edge 403 of the shortest recording mark 401 has the in-plane component in the positive direction (+Hx), and the leak magnetic field at the trailing edge 404 has the in-plane component in the negative direction (−Hx) (see FIG. 12). In the drawing, T is the cycle of the recording clock, and 1T shown in the drawing means the recording mark formed at the cycle 1T, i.e., the shortest recording mark. Explanation will be made below for the principle of reproduction at the leading edge and the trailing edge of the recording mark.

As shown in the timing chart in FIG. 14, the alternating cycle of the in-plane alternating magnetic field is synchronized with the recording clock. Therefore, the magnetic field of +Hx is generated for the in-plane alternating magnetic field at the position of the leading edge 403 of the recording mark formed in synchronization with the recording clock. That is, when the leading edge 403 is subjected to the reproduction, the in-plane magnetic field of +Hx, which is in the same direction as that of the in-plane component of the leak magnetic field of the leading edge 403, is applied. Accordingly, the in-plane component of the leak magnetic field at the leading edge 403 is amplified. The nucleation takes place in the minute area in the magnetic domain-magnifying reproducing layer by being affected by the leak magnetic field of the amplified in-plane component. The seed magnetic domain subjected to the inversion of magnetization is generated in the magnetic domain-magnifying reproducing layer. The seed magnetic domain subjected to the inversion of magnetization is magnified by the magnetic field (magnifying magnetic field) of +Hz exerted by the perpendicular magnetic coil, and it is expanded up to the size of the light spot. Subsequently, the magnified magnetic domain is reduced and extinguished by the magnetic field (erasing magnetic field) of −Hz exerted by the perpendicular magnetic coil. Accordingly, the reproduced signal from the leading edge 403 is detected as shown in the reproduced waveform illustrated in a lower part of FIG. 14.

Subsequently, when the latter half portion of the recording mark including the trailing edge 404 is subjected to the reproduction, the in-plane magnetic field of −Hx, which is the same as the in-plane component of the leak magnetic field at the trailing edge 404, is applied to the latter half portion of the recording mark. Accordingly, the in-plane component of the leak magnetic field at the latter half portion of the recording mark is amplified. The nucleation takes place in the minute area in the magnetic domain-magnifying reproducing layer by the aid of the leak magnetic field of the amplified in-plane component. The seed magnetic domain is generated in the magnetic domain-magnifying reproducing layer. The seed magnetic domain subjected to the inversion of magnetization is magnified by the magnetic field (magnifying magnetic field) of +Hz exerted by the perpendicular magnetic coil, and it is expanded up to the size of the light spot. Subsequently, the magnified magnetic domain, which has been magnified in the magnetic domain-magnifying reproducing layer, is reduced and extinguished by the magnetic field (erasing magnetic field) of −Hz exerted by the perpendicular magnetic coil. Accordingly, the reproduced signal is detected not only from the leading edge 403 of the recording mark 401 but also from the latter half portion of the recording mark including the trailing edge 404.

On the other hand, when the reproduction is performed for the leading edge 405 of the erasing mark 402 having the magnetization in the direction opposite to that of the recording mark 401, the in-plane magnetic field of +Hz in the direction opposite to that of the in-plane component of the leak magnetic field at the leading edge 405 is applied to the leading edge 405. Accordingly, the seed magnetic domain is not generated in the magnetic domain-magnifying reproducing layer. Neither transfer nor magnification of the magnetic domain occurs in the magnetic domain-magnifying reproducing layer. Therefore, no reproduced signal is detected as shown in the reproduced waveform in FIG. 14.

Further, when the reproduction is performed for the latter half portion of the mark including the trailing edge 406 of the erasing mark 402, the in-plane magnetic field of −Hz in the direction opposite to that of the in-plane component of the leak magnetic field at the trailing edge 406 is applied to the latter half portion of the erasing mark. Therefore, the seed magnetic domain is not generated in the magnetic domain-magnifying reproducing layer. Neither transfer nor magnification of the magnetic domain occurs in the magnetic domain-magnifying reproducing layer. Accordingly, no reproduced signal is detected as shown in the reproduced waveform in FIG. 14.

When the continuous recording mark is subjected to the reproduction, the reproduced signal is detected only from the former half portion of the mark including the leading edge and the letter half portion including the trailing edge of the continuous recording mark as shown in FIG. 14 in accordance with the same principle as described above. In this process, the generation of the nucleation is not caused in the magnetic domain-magnifying reproducing layer even when the in-plane magnetic field is applied, because the leak magnetic field in the in-plane direction is weak as compared with the leading edge or the trailing edge of the continuous recording mark, at portions other than the former half portion of the mark including the leading edge and the latter half portion including the trailing edge of the continuous recording mark, for example, at the central portion of the continuous recording mark. Therefore, as shown in FIG. 14, the reproduced signal is not detected from the portions other than the former half portion of the mark including the leading edge and the latter half portion including the trailing edge of the continuous recording mark, for example, from the central portion of the continuous recording mark.

As described above, in the reproducing method of this embodiment, the reproduced signal can be detected from the former half portion including the leading edge and the latter half portion including the trailing edge of the recording mark respectively, by mutually changing the alternating cycles of the perpendicular alternating magnetic field and the in-plane alternating magnetic field.

Accordingly, even in the case of the continuous recording mark, the reproduced signal can be reliably detected to know the recording mark length from the portions in the vicinity of the leading edge and the trailing edge of the continuous recording mark. Therefore, it is possible to reliably reproduce information in a stable manner.

Figure 3:
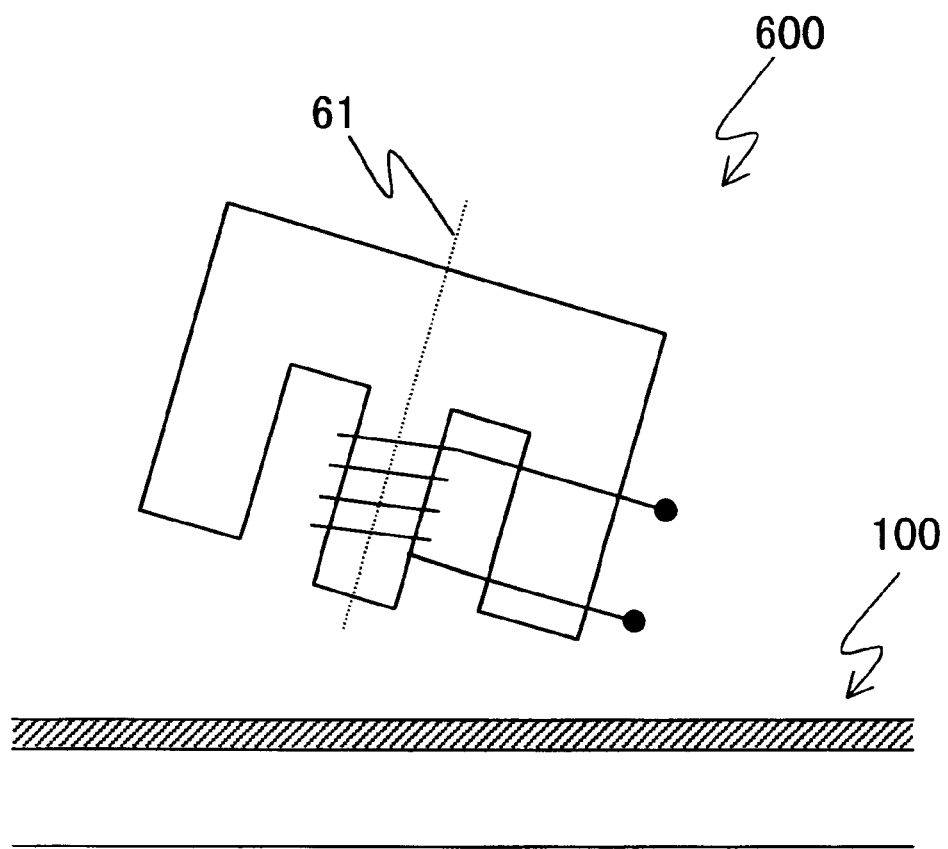
FIG. 3 schematically shows an E-type magnetic coil capable of applying a recording magnetic field obliquely with respect to the information-recording medium.

Explanation has been made for the embodiments of the information-recording medium, the recording medium, the reproducing method, and the recording and reproducing apparatus according to the present invention. However, the present invention is not limited to the embodiments described above. The recording and reproducing apparatus described in the first embodiment uses the magnetic coil comprising the coil wound around the columnar magnetic core. However, there is no limitation thereto. It is possible to use a known E-type magnetic coil and a C-type magnetic coil. For example, in the case of an E-type magnetic coil 600 as shown in FIG. 3, it may be arranged so that an axis of magnetic field generation 61 is directed in an oblique direction with respect to the surface of the magneto-optical recording medium 100.

In the embodiments described above, the recording apparatus according to the fourth aspect of the present invention and the reproducing apparatus according to the tenth aspect of the present invention are constructed as the same apparatus. However, it is also possible to construct a recording apparatus capable of only recording of information, or a reproducing apparatus capable of only reproduction of information.

Figure 4:
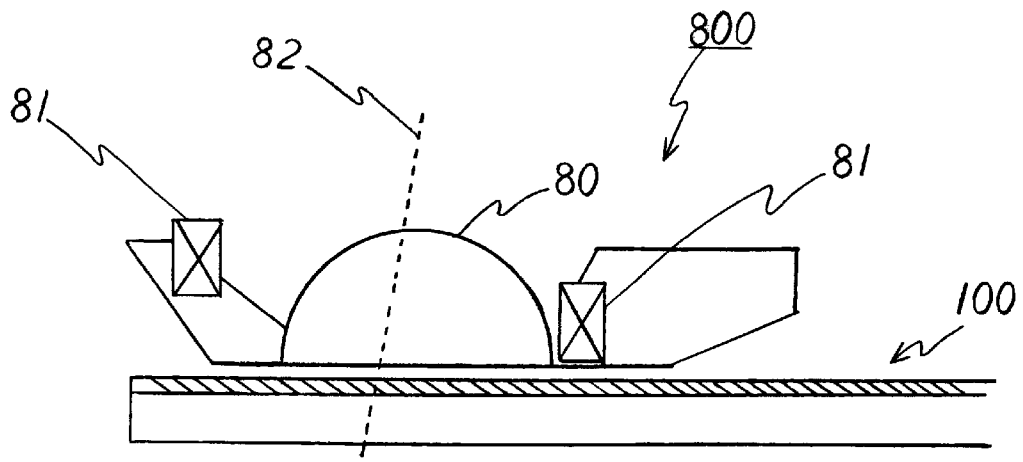
FIG. 4 schematically shows a magnetic head which carries an SIL (solid immersion lens) and which is capable of applying a magnetic field obliquely with respect to the medium.
Figure 5:
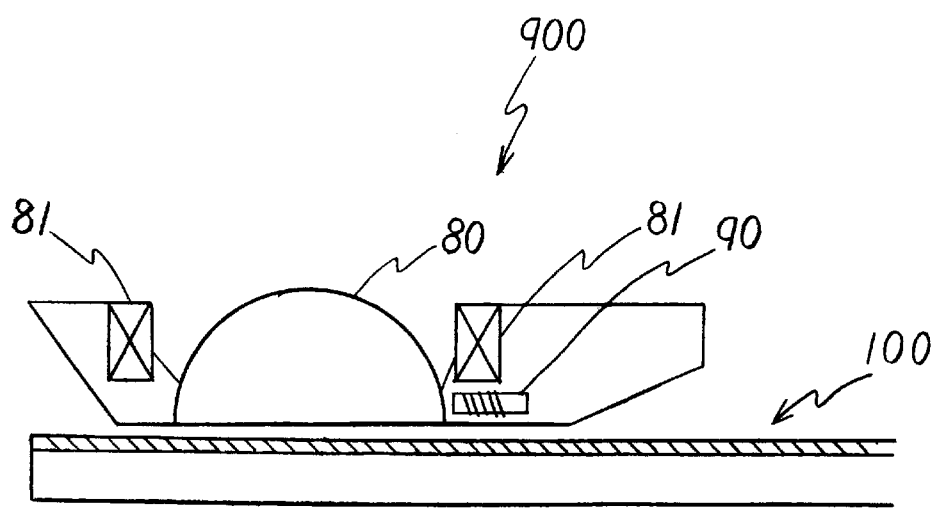
FIG. 5 schematically shows a magnetic head which is provided with an SIL and magnetic coils for applying magnetic fields in the perpendicular direction and in the in-plane direction respectively.

Those usable as the recording and reproducing apparatus according to the present invention include a recording apparatus comprising a magnetic head 800 which carries an SIL (Solid Immersion Lens) 80 as shown in FIG. 4. In this case, a magnetic coil 81 is provided obliquely so that an axis of magnetic field generation 82 of the magnetic coil 81 is oblique with respect to the medium 100. Alternatively, as shown in FIG. 5, it is also possible to use a magnetic head 900 which is newly provided with a magnetic coil 90 capable of generating a magnetic field in the in-plane direction. In this case, a permanent magnetic can be also used in place of the magnetic coil 90. When the magnetic head which carries SIL as described above is used, it is necessary that the recording light beam is allowed to come into the medium on the side opposite to the substrate. Therefore, it is desirable to use a layered structure of the medium comprising a recording layer, a recording auxiliary layer, a non-magnetic layer, and a reproducing layer which are provided in this order on the substrate. The SIL described above may be modified as an SIM (Solid Immersion Mirror) in which a metal reflective film is coated on surface portions other than the light-incoming/outgoing surface to utilize light reflection in the SIL so that the near field light is enhanced. In this case, the magnetic coil may be arranged in the same manner as in the SIL.

Figure 6A:
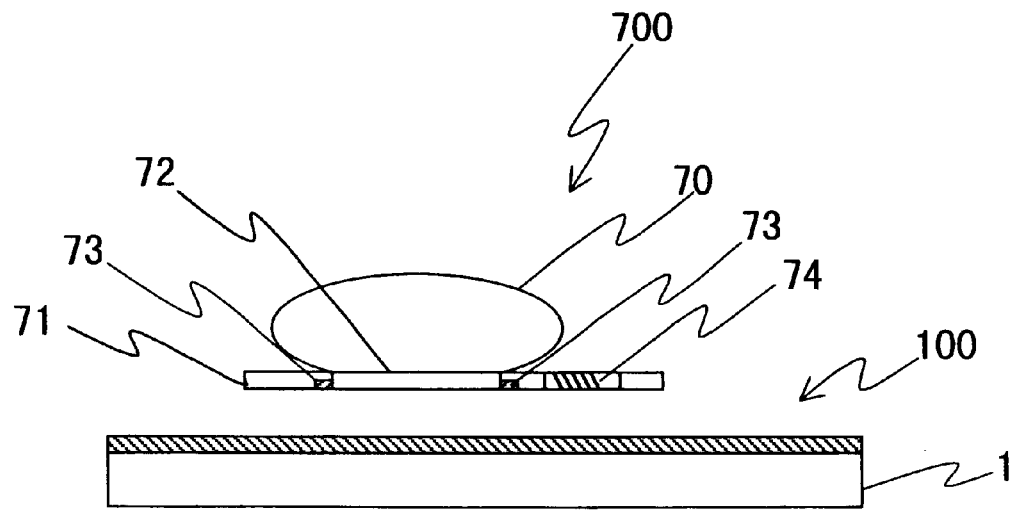
Figure 6B:
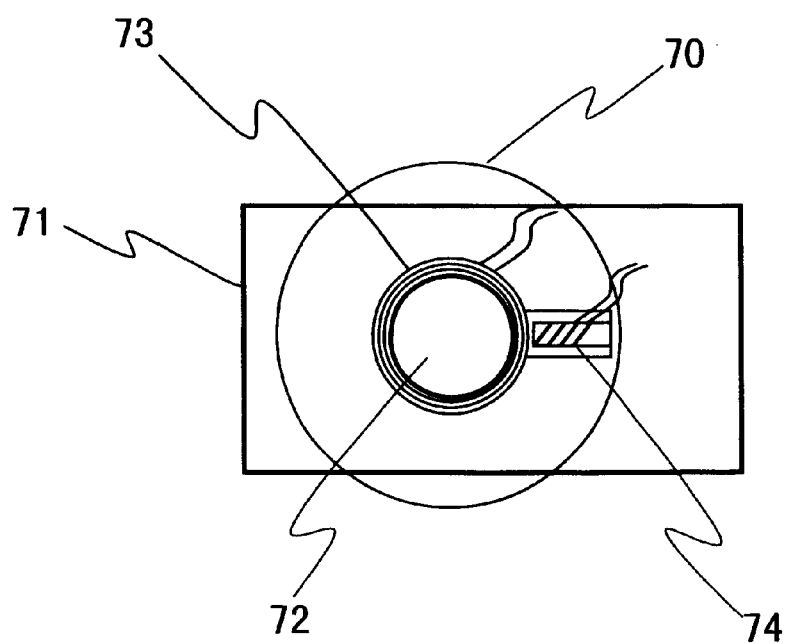

A magnetic head 700 as shown in FIG. 6 may be used as another modified embodiment of the magnetic head for introducing the recording light beam from the side opposite to the substrate. The magnetic head 700 shown in FIG. 6 principally comprises a collective lens 70 having an NA of not less than 0.5 and a lens support plate 71 composed of permalloy. A circular hole 72 is formed through the lens support plate 71. The recording light beam, which is collected by the collective lens 70, passes through the hole 72, and it is radiated onto the medium 100. A coil 73 for generating the perpendicular magnetic field is formed with a printed circuit around the hole 72, making it possible to apply the magnetic field in the perpendicular direction to the medium 100. A C-shaped or ]-shaped cutout is formed on the lens support plate 74 adjacent to the hole 72. A magnetic coil 74 for generating the in-plane magnetic field is wound at a slender portion compared by the cutout. The magnetic coil 74 can be used to generate the magnetic field in the in-plane direction. The magnetic head 700 having such a structure is also applicable to the recording and reproducing apparatus of the present invention.

The information-recording medium of the present invention has been explained as exemplified by the magneto-optical recording medium. However, the present invention is not limited thereto. For example, the present invention is also applicable to a magnetic recording medium such as a magnetic disk provided with a perpendicularly magnetizable film for a recording layer, and a magnetic disk having a pre-emboss type plastic substrate. The present applicant has disclosed, in Japanese Patent Application No. 10-328788, a heat-assist type magnetic recording medium which uses, as a recording layer, a perpendicularly magnetizable film having a Curie temperature of not less than 300° C., having a coercive force of not less than 5 [kOe] (about 395 [kA/m]) within a temperature range of 10 to 100° C., and having a coercive force of not more than 2 [kOe] (about 158 [kA/m]) in a temperature area of not less than 200° C. The recording method and the recording apparatus of the present invention are also applicable to such a magnetic recording medium.

According to the recording method of the present invention, it is possible to easily cause the inversion of magnetization of the recording magnetic domain in the recording layer of the information-recording medium. Therefore, it is possible to widen the power margins of the recording light beam and the recording magnetic field as compared with the conventional technique. Further, the recording magnetic domain, which is formed in the recording layer, is extremely minute. Therefore, it is possible to achieve the high density recording.

The recording apparatus of the present invention is capable of applying the recording magnetic field in the oblique direction with respect to the information-recording medium. Therefore, it is possible to individually form the minute magnetic domains reliably in the recording layer. Therefore, the recording apparatus of the present invention is extremely preferable as a recording apparatus for the super high density recording. Further, it is possible to record information with a small magnetic field. Therefore, it is possible to reduce the electric power consumption of the magnetic coil. Furthermore, it is also possible to decrease the turn number of the magnetic coil. Therefore, the inductance is lowered, and it is possible to perform the high speed recording and reproduction by means of the high speed driving.

The information-recording medium of the present invention makes it possible to transfer the minute recording magnetic domain to the reproducing layer reliably with ease. Therefore, it is possible to widen the power margins of the reproducing light beam and the reproducing magnetic field as compared with the conventional technique. Further, the reproduced signal can be amplified by allowing the reproducing layer to function as the magnetic domain-magnifying reproducing layer. Therefore, it is possible to improve C/N of the reproduced signal.

When the reproducing method of the present invention is used, it is possible to amplify only the in-plane leak magnetic field in the predetermined direction generated from the recording magnetic domain. Therefore, the inversion of magnetization in the reproducing layer can be easily caused on the basis of the reproducing magnetic field and the in-plane leak magnetic field in the predetermined direction as described above.

The reproducing apparatus of the present invention is capable of applying the reproducing magnetic field in the oblique direction to the medium. Therefore, it is possible to individually transfer the minute magnetic domain to the reproducing layer in a reliable manner. Therefore, the reproducing apparatus of the present invention is extremely preferable as a reproducing apparatus for performing the reproduction on the magneto-optical recording medium for MSR and the magneto-optical recording medium for MAM-MOS subjected to the super high density recording.

What is claimed is:

1. A recording method on an information-recording medium with a plurality of tracks for recording information by applying a recording magnetic field by using a magnetic field-generating source to an area on a surface of the information-recording medium irradiated with a recording light beam while radiating the recording light beam onto the surface of the disk-shaped information-recording medium including a recording layer, the method of comprising:

generating the recording magnetic field from the magnetic field-generating source in an oblique direction with respect to the surface of the information-recording medium so that the recording magnetic field has an in-plane component which is parallel to the surface of the information-recording medium in the area, and the in-plane component is in the same direction of a track existing in the area, wherein the information-recording medium is a magnetic recording medium based on the use of a perpendicularly magnetizable film having perpendicular magnetization in the recording layer, and the perpendicularly magnetizable film has a Curie temperature of not less than 250° C., having a coercive force of not less than 5 kOe within a temperature range of 10 to 100° C. and having a coercive force of not more than 2 kOe at a temperature of not less than 200° C.

2. The recording method according to claim 1, wherein the recording layer is a perpendicularly magnetizable film, and the recording magnetic field is applied in an oblique direction with respect to a direction of magnetization in the recording layer.

3. The recording method according to claim 1, wherein the recording magnetic field is applied such that a magnetic coil is used for the magnetic field-generating source, and the magnetic oil is arranged so that an axis of magnetic field generation of the magnetic coil is oblique with respect to the surface of the information-recording medium, and a geometrically projected component of the axis of magnetic field generation onto the medium surface is directed in the direction of the track.

4. The recording method according to claim 1, wherein the information-recording medium further comprises a recording auxiliary layer having perpendicular magnetic anisotropy which is smaller than perpendicular magnetic anisotropy of the recording layer, and the recording auxiliary layer is formed in contact with the recording layer.

5. The recording method according to claim 4, wherein the recording auxiliary layer has in-plane magnetization within a temperature range of 200° C. to 350° C.

6. A recording method on an information-recording medium for recording information on the information-recording medium including a recording layer, comprising:

radiating a recording light beam while applying a recording magnetic field, wherein the information-recording medium includes a recording auxiliary layer in contact with the recording layer, the recording auxiliary layer has perpendicular magnetic anisotropy smaller than perpendicular magnetic anisotropy of the recording layer, and the recording magnetic field is applied in an oblique direction to a surface of the information-recording medium and wherein the information-recording medium is a magnetic recording medium based on the use of a perpendicularly magnetizable film having perpendicular magnetization in the recording layer, and the perpendicularly magnetizable film has a Curie temperature of not less than 250° C., having a coercive force of not less than 5 kOe within a temperature range of 10 to 100° C. and having a coercive force of not more than 2 kOe at a temperature of not less than 200° C.

7. The recording method according to claim 6, wherein the recording auxiliary layer has in-plane magnetization within a temperature range of 200° C. to 350° C.

* * * * *